(12) United States Patent
Heo et al.

(10) Patent No.: US 12,388,674 B2
(45) Date of Patent: Aug. 12, 2025

(54) ELECTRONIC DEVICE AND METHOD OF OPERATING THE SAME

(71) Applicant: SAMSUNG ELECTRONICS CO., LTD., Suwon-si (KR)

(72) Inventors: Junyeon Heo, Suwon-si (KR); Changwon Kim, Suwon-si (KR); Joohee Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/092,024

(22) Filed: Dec. 30, 2022

(65) Prior Publication Data

US 2023/0188378 A1 Jun. 15, 2023

Related U.S. Application Data

(63) Continuation of application No. PCT/KR2022/020228, filed on Dec. 13, 2022.

(30) Foreign Application Priority Data

Dec. 14, 2021 (KR) .......................... 10-2021-0178717
Dec. 30, 2021 (KR) .......................... 10-2021-0192671

(51) Int. Cl.
*H04L 12/28* (2006.01)
*H04L 67/125* (2022.01)

(52) U.S. Cl.
CPC .......... *H04L 12/282* (2013.01); *H04L 67/125* (2013.01)

(58) Field of Classification Search
CPC ........................... H04L 12/282; H04L 67/125
See application file for complete search history.

(56) References Cited

U.S. PATENT DOCUMENTS

| 7,124,087 | B1 | 10/2006 | Rodriguez et al. |
| 8,620,841 | B1 * | 12/2013 | Filson ................. H04L 12/1895 706/12 |
| 10,051,068 | B2 | 8/2018 | Sharma et al. |
| 10,855,833 | B2 | 12/2020 | Santamaria et al. |

(Continued)

FOREIGN PATENT DOCUMENTS

| JP | 4251902 B2 | 4/2009 |
| JP | 2011-158186 A | 8/2011 |

(Continued)

OTHER PUBLICATIONS

International Search Report & Written Opinion(PCT/ISA/210 & 237) issued Mar. 13, 2023 from the International Searching Authority in International Application No. PCT/KR2022/020228.

*Primary Examiner* — Dhairya A Patel
(74) *Attorney, Agent, or Firm* — Sughrue Mion, PLLC

(57) ABSTRACT

An electronic device includes a communication module, and processor and a memory. The communication module connects with an Internet of Things server and plural smart devices. The processor is operatively connected to the communication module. The memory is operatively connected to the processor and includes instructions which, when executed by the processor, cause the processor to configure a control interface for controlling operations of the smart devices according to a user schedule type of a user schedule, and control the operations of the smart devices through the control interface.

18 Claims, 30 Drawing Sheets

(56) References Cited

U.S. PATENT DOCUMENTS

| | | | |
|---|---|---|---|
| 11,727,085 B2 | 8/2023 | Samal et al. | |
| 2004/0203644 A1 | 10/2004 | Anders et al. | |
| 2013/0090767 A1* | 4/2013 | Bruck | G05D 23/1902 |
| | | | 700/276 |
| 2016/0179075 A1* | 6/2016 | Shin | G06F 3/016 |
| | | | 700/275 |
| 2019/0199549 A1* | 6/2019 | Park | H04L 12/2816 |
| 2020/0065123 A1* | 2/2020 | Yang | G06F 9/455 |
| 2020/0294503 A1* | 9/2020 | Ryu | G06F 3/167 |
| 2020/0383033 A1* | 12/2020 | Foti | H04W 76/16 |
| 2021/0193333 A1* | 6/2021 | Nishimura | H04Q 9/00 |
| 2022/0151450 A1* | 5/2022 | Case | B25J 13/003 |
| 2023/0199878 A1* | 6/2023 | Kwon | H04L 12/12 |
| | | | 370/329 |
| 2023/0205157 A1* | 6/2023 | Myung | H04Q 9/00 |
| | | | 700/28 |
| 2023/0291826 A1* | 9/2023 | Xu | G06F 1/1626 |
| 2024/0064413 A1* | 2/2024 | Saragih | H04N 23/74 |
| 2024/0249556 A1* | 7/2024 | Tusch | G06V 20/52 |

FOREIGN PATENT DOCUMENTS

| | | |
|---|---|---|
| JP | 6218852 B2 | 10/2017 |
| JP | 6433563 B2 | 12/2018 |
| KR | 10-0619955 B1 | 9/2006 |
| KR | 10-1684423 B1 | 12/2016 |
| KR | 10-2050425 B1 | 1/2020 |
| KR | 10-2247518 B1 | 5/2021 |

\* cited by examiner

FIG. 8

SCHEDULE TYPE = "HOME WORKING"

| DEVICE | DEFAULT VALUE | | DEVICE OPTION ACCORDING TO EACH SCHEDULE TIME POINT | | |
|---|---|---|---|---|---|
| | USE TYPE | STAND FEATURES | BEFORE | START | AFTER |
| MOBILE | USED | TURNED ON | ON | EXECUTE | CHANGEABLE |
| TABLET | USED | TURNED ON | ON | EXECUTE | CHANGEABLE |
| BUDS | USED | TURNED ON | TURNED ON | TURNED ON | CHANGEABLE |
| SPEAKER | RESTRICTED | TURNED ON | TURNED ON | MUTE | CHANGEABLE |
| WASHING MACHINE | RESTRICTED | TURNED ON | RESERVATION | RESERVATION | EXECUTE |
| DRYING MACHINE | RESTRICTED | TURNED ON | RESERVATION | RESERVATION | EXECUTE |
| ROBOT CLEANER | RESTRICTED | RETURNED | TURNED ON | RETURNED | CHANGEABLE |
| AIR CONDITIONER | USED | WIRELESS | TURNED ON | WIRELESS | CHANGEABLE |
| AIR PURIFIER | USED | WIRELESS | TURNED ON | WIRELESS | CHANGEABLE |
| TV | RESTRICTED | TURNED OFF | TURNED ON | TURNED OFF | CHANGEABLE |

<HOME WORKING>

1900

| DEVICE | DEVICE CHARACTERISTIC | | |
|---|---|---|---|
| | MOBILITY | WHETHER (WIRED/WIRELESS) CHARGING IS REQUIRED | WHETHER IT IS PUBLIC DEVICE |
| MOBILE | ○ | (WIRELESS) ○ | Personal |
| TABLET | ○ | (WIRELESS) ○ | Personal |
| WATCH | ○ | (WIRELESS) ○ | Personal |
| BUDS | ○ | (WIRELESS) ○ | Personal |
| SPEAKER | FIXED | (WIRED/WIRELESS) ×/○ | Public |
| WASHING MACHINE | FIXED | (WIRED) × | Public |
| DRYING MACHINE | FIXED | (WIRED) × | Public |
| STEAM CLOSET | FIXED | (WIRED) × | Public |
| SHOES CLEANER | FIXED | (WIRED) × | Public |
| ROBOT CLEANER | FIXED | (WIRELESS) ○ | Public |
| OVEN | FIXED | (WIRED) × | Public |
| AIR CONDITIONER | FIXED | (WIRED) × | Public |
| AIR PURIFIER | FIXED | (WIRED) × | Public |
| TV | FIXED | (WIRED) × | Public |
| SOUND BAR (AUDIO) | FIXED | (WIRED) × | Public |
| LIGHT | FIXED | (유선) × | Public |

FIG. 20

<HOME WORKING>

2000

| DEVICE | DEFAULT VALUE | | DEVICE OPTION ACCORDING TO EACH SCHEDULE TIME POINT | | | |
|---|---|---|---|---|---|---|
| | USE TYPE | BASICS | BEFORE | START | DURING | AFTER |
| MOBILE | USED | TURNED ON | ON | EXECUTED | STATE MAINTAINED | CHANGEABLE |
| TABLET | USED | TURNED ON | ON | EXECUTED | STATE MAINTAINED | CHANGEABLE |
| BUDS | USED | CONNECTED | CONNECTED | CONNECTED | STATE MAINTAINED | CHANGEABLE |
| SPEAKER | RESTRICTED | CONNECTED | CONNECTED | MUTE | STATE MAINTAINED | CHANGEABLE |
| WASHING MACHINE | RESTRICTED | CONNECTED | RESERVATION EXECUTED | RESERVATION EXECUTED | RESERVATION EXECUTED | EXECUTED |
| DRYING MACHINE | RESTRICTED | CONNECTED | RESERVATION EXECUTED | RESERVATION EXECUTED | RESERVATION EXECUTED | EXECUTED |
| ROBOT CLEANER | RESTRICTED | RETURNED | CONNECTED | RETURNED | STATE MAINTAINED | CHANGEABLE |
| AIR CONDITIONER | USED | WIRELESS | CONNECTED | WIRELESS | STATE MAINTAINED | CHANGEABLE |
| AIR PURIFIER | USED | WIRELESS | CONNECTED | WIRELESS | STATE MAINTAINED | CHANGEABLE |
| TV | RESTRICTED | TURNED OFF | CONNECTED | TURNED OFF | STATE MAINTAINED | CHANGEABLE |

FIG. 23

<TRAVEL>

2300

| RELEVANT DEVICE | DEVICE CHARACTERISTIC | | |
|---|---|---|---|
| | WHETHER IT IS PUBLIC DEVICE | MOBILITY | REQUIRED TO BE (WIRELESSLY/WIREDLY) CHARGED |
| MOBILE | Personal | ○ | [WIRELESSLY] ○ |
| AIR CONDITIONER | Public | FIXED | [WIREDLY] × |
| AIR PURIFIER | Public | FIXED | [WIREDLY] × |
| HOME CCTV | Public | FIXED | [WIREDLY] × |
| OPEN/CLOSE SENSOR | Public | FIXED | [WIRELESSLY] ○ |
| HUMAN BODY DETECTION SENSOR | Public | FIXED | [WIRELESSLY] ○ |
| SMOKE DETECTOR | Public | FIXED | [WIRELESSLY] ○ |
| LEAKAGE DETECTION SENSOR | Public | FIXED | [WIRELESSLY] ○ |

FIG. 24

<TRAVEL>

2400

| DEVICE | DEFAULT VALUE | | DEVICE OPTION ACCORDING TO EACH SCHEDULE TIME POINT | | | |
|---|---|---|---|---|---|---|
| | USE TYPE | BASICS | BEFORE | START | DURING | AFTER |
| MOBILE | USED | TURNED ON | On | EXECUTED | STATE MAINTAINED | CHANGEABLE |
| AIR CONDITIONER | RESTRICTED | TURNED OFF (RESERVATION CANCEL) | CONNECTED | TURNED OFF (RESERVATION CANCEL) | STATE MAINTAINED | CHANGEABLE |
| AIR PURIFIER | RESTRICTED | TURNED OFF (RESERVATION CANCEL) | CONNECTED | TURNED OFF (RESERVATION CANCEL) | STATE MAINTAINED | CHANGEABLE |
| HOME CCTV | USED | TURNED ON | CONNECTED | SECURITY (OUTDOOR) | SECURITY (OUTDOOR) | SECURITY RELEASE |
| OPEN/CLOSE SENSOR | USED | TURNED ON | CONNECTED | SECURITY (OUTDOOR) | SECURITY (OUTDOOR) | SECURITY RELEASE |
| HUMAN BODY SENSOR | USED | TURNED ON | CONNECTED | SECURITY (OUTDOOR) | SECURITY (OUTDOOR) | SECURITY RELEASE |
| SMOKE DETECTOR | USED | TURNED ON | CONNECTED | SECURITY (OUTDOOR) | SECURITY (OUTDOOR) | SECURITY RELEASE |
| LEAKAGE DETECTION SENSOR | USED | TURNED ON | CONNECTED | SECURITY (OUTDOOR) | SECURITY (OUTDOOR) | SECURITY RELEASE |

WATCHING CONTENT (WATCHING SPORTS GAME)

| DEVICE | DEVICE CHARACTERISTIC | | |
| --- | --- | --- | --- |
| | MOBILITY | REQUIRED TO BE (WIRELESSLY/WIREDLY) CHARGED | WHETHER IT IS PUBLIC DEVICE |
| MOBILE | ○ | (WIRELESSLY) ○ | Personal |
| SPEAKER | FIXED | (WIRELESSLY/WIREDLY) ×/○ | Public |
| AIR CONDITIONER | FIXED | (WIREDLY) × | Public |
| TV | FIXED | (WIREDLY) × | Public |
| SOUND BAR (AUDIO) | FIXED | (WIREDLY) × | Public |

FIG. 28

WATCHING CONTENT (WATCHING SPORTS GAME)

| DEVICE | DEFAULT VALUE | | | DEVICE OPTION ACCORDING TO EACH SCHEDULE TIME POINT | | | |
|---|---|---|---|---|---|---|---|
| | USE TYPE | BASICS | | BEFORE | START | DURING | AFTER |
| MOBILE | USED | TURNED ON | | ON | EXECUTED | STATE MAINTAINED | CHANGEABLE |
| SPEAKER | RESTRICTED | MUTE | | CONNECTED | MUTE | MUTE | ORIGINAL STATE |
| TV | USED | SPORTS MODE | | CONNECTED | SPORTS MODE | SPORTS MODE | ORIGINAL STATE |
| SOUND BAR (AUDIO) | USED | SPORTS MODE | | CONNECTED | SPORTS MODE | SPORTS MODE | ORIGINAL STATE |
| AIR CONDITIONER | USED | AIR CONDITIONING | | CONNECTED | AIR CONDITIONING | AIR CONDITIONING | ORIGINAL STATE |

FIG. 29

HOME TRAINING

2900

| DEVICE | DEVICE CHARACTERISTIC | | |
|---|---|---|---|
| | MOBILITY | REQUIRED TO BE (WIRELESSLY/WIRED) CHARGED | WHETHER IT IS PUBLIC DEVICE |
| MOBILE | ○ | (WIRELESSLY) ○ | Personal |
| Watch | ○ | (WIRELESSLY) ○ | Personal |
| SPEAKER | FIXED | (WIRELESSLY/WIRED) ×/○ | Public |
| WASHING MACHINE | FIXED | (WIRED) × | Public |
| STEAM CLOSET | FIXED | (WIRED) × | Public |
| AIR CONDITIONER | FIXED | (WIRED) × | Public |
| AIR PURIFIER | FIXED | (WIRED) × | Public |
| TV | FIXED | (WIRED) × | Public |
| LIGHT | FIXED | (WIRED) × | Public |

| RELEVANT DEVICE | DEFAULT VALUE | | DEVICE OPTION ACCORDING TO EACH SCHEDULE TIME POINT | | | |
|---|---|---|---|---|---|---|
| | USE TYPE | BASICS | BEFORE | START | DURING | AFTER |
| MOBILE | USED | TURNED ON | On | EXECUTED | STATE MAINTAINED | CHANGEABLE |
| Watch | USED | EXERCISE MODE | CONNECTED | EXERCISE MODE | EXERCISE MODE | ORIGINAL STATE |
| SPEAKER | USED | TURNED ON | CONNECTED | On | Volume Up | ORIGINAL STATE |
| WASHING MACHINE | PREPARED | SPORTSWEAR | STATE MAINTAINED | STATE MAINTAINED | STATE MAINTAINED | SPORTSWEAR (IF CAN BE STARTED) |
| STEAM CLOSET | PREPARED | SPORTSWEAR | REFRESH (IF CAN BE STARTED) | STATE MAINTAINED | STATE MAINTAINED | SPORTSWEAR (IF CAN BE STARTED) |
| AIR CONDITIONER | USED | AIR CONDITIONING | CONNECTED | AIR CONDITIONING | AIR CONDITIONING | ORIGINAL STATE |
| AIR PURIFIER | USED | TURNED ON | CONNECTED | CLEAN MODE | CLEAN MODE | ORIGINAL STATE |
| TV | USED | TURNED ON | CONNECTED | On | SPORTS MODE | ORIGINAL STATE |
| LIGHT | USED | BRIGHTENED | CONNECTED | On | BRIGHTENED | ORIGINAL STATE |

ELECTRONIC DEVICE AND METHOD OF OPERATING THE SAME

CROSS-REFERENCE TO RELATED APPLICATION(S)

This application is a continuation Application of International Application No. PCT/KR2022/020228 filed on Dec. 13, 2022 with the World Intellectual Property Organization (WIPO), and is based on and claims priority under 35 U.S.C. § 119 to Korean Patent Application No. 10-2021-0178717, filed on Dec. 14, 2021 and Korean Application No. 10-2021-0192671, filed on Dec. 30, 2021, in the Korean Intellectual Property Office, the disclosures of each of which being incorporated by reference herein in their entireties.

BACKGROUND

1. Field

The disclosure relates to an electronic device capable of controlling smart devices according to user schedules and a method of operating the same.

2. Description of Related Art

Smart devices (for example, table PCs, smart watches, smart audio devices, smart video devices, home appliances, lights, smart door locks, and a plurality of detection sensors) operating through the connection with an electronic device (for example, a smartphone) within the home (or office) are increasing. A technology for controlling the operation of each smart device through the electronic device (for example, the smartphone) has been proposed, but the operation is controlled according to operation states of the smart devices. In order to prepare operations of the plurality of smart devices and change states of the plurality of smart devices according to user schedules, a control interface capable of controlling the plurality of devices according to the user schedules should be generated and provided.

The above information is provided as only background information to help for understanding of the disclosure. A determination indicating which content can be applied as prior arts in connection with the disclosure has not been made and nothing has been claimed.

SUMMARY

In accordance with an aspect of the disclosure, an electronic device may comprise a communication module configured to connect with an Internet of Things server and a plurality of smart devices; a processor operatively connected to the communication module; and a memory operatively connected to the processor, the memory comprising instructions which, when executed by the processor, cause the processor to configure a control interface for controlling operations of the plurality of smart devices according to a user schedule type of a user schedule; and control the operations of the plurality of smart devices through the control interface.

In accordance with another aspect of the disclosure, a method of operating an electronic device may comprise connecting with an Internet of Things server and a plurality of smart devices, registering a user schedule, configuring a control interface for controlling operations of the plurality of smart devices according to a user schedule type of the user schedule, and controlling the operations of the plurality of smart devices through the control interface.

Additional aspects will be set forth in part in the description which follows and, in part, will be apparent from the description, or may be learned by practice of the presented embodiments.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 8 illustrates an example of the configuration of an option interface of devices (for example, smart devices) for each time point of the user schedule, according to some embodiments;

FIG. 19 illustrates an example of a user configuration option of a control interface for each device (for example, smart device) according to a user schedule (for example, home working), according to some embodiments;

FIG. 20 illustrates an example of a user configuration option of a control interface for each time point of a user schedule according to the user schedule (for example, home working), according to some embodiments;

FIG. 23 illustrates an example of a user configuration option of a control interface for each device (for example, smart device) according to a user schedule (for example, travel), according to some embodiments;

FIG. 24 illustrates an example of a user configuration option of a control interface for each time point of a user schedule according to the user schedule (for example, travel), according to some embodiments;

FIG. 28 illustrates an example of a user configuration option of a control interface for each time point of a user schedule according to the user schedule (for example, watching content), according to some embodiments;

FIG. 29 illustrates an example of a user configuration option of a control interface for each device (for example, smart device) according to a user schedule (for example, home training), according to some embodiments; and FIG. 30 illustrates an example of a user configuration option of a control interface for each time point of a user schedule according to the user schedule (for example, home training), according to some embodiment.

DETAILED DESCRIPTION

Figure 1:
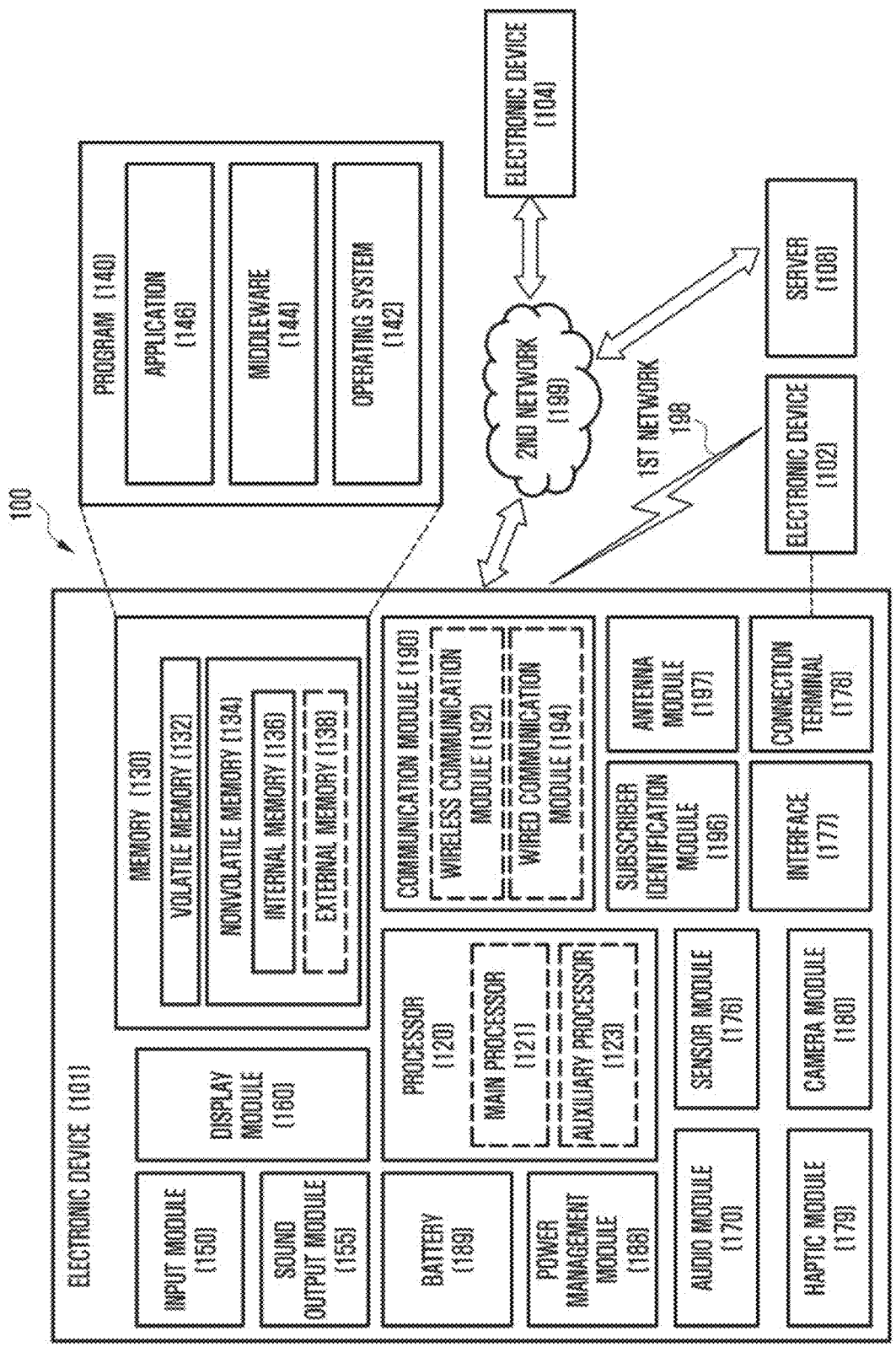
FIG. 1 is a block diagram illustrating an electronic device within a network environment according to various embodiments.

The description made with reference to the accompanying drawings is provided to help for inclusive understanding of various embodiments as defined by the claims and equivalent thereto. Throughout the drawings, it may be understood that similar reference numbers refer to similar elements, components, and structures. Various detailed matters to help for understanding are included herein, but should be considered as only examples. Accordingly, those skilled in the art recognize that various changes and modifications of various embodiments in the specification can be made without departing from the scope and idea of the disclosure. Further, the description of well known functions and configurations may be omitted for clearness and briefness.

Terms and words used in the following description and claims are not limited to bibliographical meanings, and are merely used by inventors for clear and consistent understanding of the disclosure. Accordingly, it should be apparent to those skilled in the art that the following description of various embodiments is not to limit the disclosure defined by the accompanying drawings and equivalent thereto and is merely provided for the purpose of examples.

Unless otherwise noted in the context, singular expressions should be understood as including a plurality of targets. Therefore, for example, an expression of "element surfaces" may include an expression of one or more of the surfaces.

Once a user schedule stored in an electronic device starts, many steps are needed and it takes a time to configure a function of each of a plurality of smart devices associated with the user schedule. Further, even though the user schedule starts, a user may be absent in a configured location or time, or at least one smart device cannot operate, but there is no clear solution to these issues. In addition, a notification is provided on the basis of states of the smart devices rather than the user, and thus it is not possible to control operations of the smart devices according to the user schedule. Smart devices (for example, tablet PCs, smart watches, smart audio devices, smart video devices, home appliances, lights, smart door locks, and a plurality of detection sensors) operating through a link with an electronic device (for example, a smart phone) within home (or office) have increased, but there is no method of controlling the plurality of smart devices according to the user schedule.

Various embodiments may provide an electronic device and a method of operating the same capable of generating and providing a control interface for controlling smart devices according to a user schedule.

The technical subjects pursued in this document are not limited to the above mentioned technical subjects, and other technical subjects which are not mentioned may be clearly understood through the following descriptions by those skilled in the art of this document.

Additional aspects are partially described in the following description, and parts thereof may become clear from the description or understood by the presented embodiments.

An electronic device according to various embodiments may include a communication module configured to make a connection with a plurality of smart devices and an Internet of Things (TOT) server, a processor operatively connected to the communication module, and a memory operatively connected to the processor. The memory may include instructions causing the processor to configure a control interface for controlling operations of the plurality of smart devices according to a user schedule type, based on an input user schedule and control the operations of the plurality of smart devices through the control interface.

A method of operating an electronic device according to embodiments may include making a connection with a plurality of smart devices and an Internet of Things (TOT) server, registering a user schedule, configuring a control interface for controlling operations of the plurality of smart devices according to a user schedule type, and controlling the operation of the plurality of smart devices through the control interface.

The electronic device and the method of operating the same according to various embodiments may provide a customized control interface for controlling operations of smart devices having high usage correlation with user schedules on the basis of calendar schedules.

The electronic device and the method of operating the same according to various embodiments may provide a customized control interface for pre-emptively controlling operations of smart devices according to each time point (for example, before the schedule, at which the schedule starts, during the schedule, or after the schedule) of the user schedule.

The electronic device and the method of operating the same according to various embodiments may provide a customized control interface for controlling operations of smart devices in further consideration of a user condition at a time point at which the control interface is provided.

The electronic device and the method of operating the same according to various embodiments may provide a user experience capable of easily controlling operations of a plurality of smart devices by reducing steps of identifying the user schedule, reducing cumbersome steps of finding functions of the plurality of smart devices and controlling the same, and providing a control interface according to the user schedule.

The electronic device and the method of operating the same according to various embodiments may provide a control interface capable of controlling a plurality of smart devices according to a user schedule and control operations of the plurality of smart devices according to a user schedule through the control interface.

The electronic device and the method of operating the same according to various embodiments may provide a control interface capable of controlling operations of a plurality of smart devices when a state of a device (for example, smart device) registered in a user schedule (for example, home working, home training, travel, or watching content) does not match a state of a device at the current time point (for example, smart device).

The electronic device and the method of operating the same according to various embodiments may provide a control interface capable of controlling operations of a plurality of smart devices when a location registered in a user schedule (for example, home working, home training, travel, or watching content) does not match a current user location.

The electronic device and the method of operating the same according to various embodiments may provide a control interface capable of controlling operations of a plurality of smart devices according to a user schedule (for example, home working, home training, travel, or watching content).

The electronic device and the method of operating the same according to various embodiments may provide a control interface capable of controlling operations of a plurality of smart devices for each time point of the user schedule according to the user schedule (for example, home working, home training, travel, or watching content).

In addition, various effects directly or indirectly detected through the disclosure can be provided.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module(SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to an embodiment, a display module 160 may include a flexible display configured to be folded or unfolded.

According to an embodiment, the display module 160 may include a flexible display arranged to be slidable and configured to provide a screen (for example, a display screen).

According to an embodiment, the display module 160 may be referred to as a variable display (for example, a stretchable display), an expandable display, or a slide-out display.

According to an embodiment, the display module 160 may include a bar-type or a plate-type display.

Figure 2:
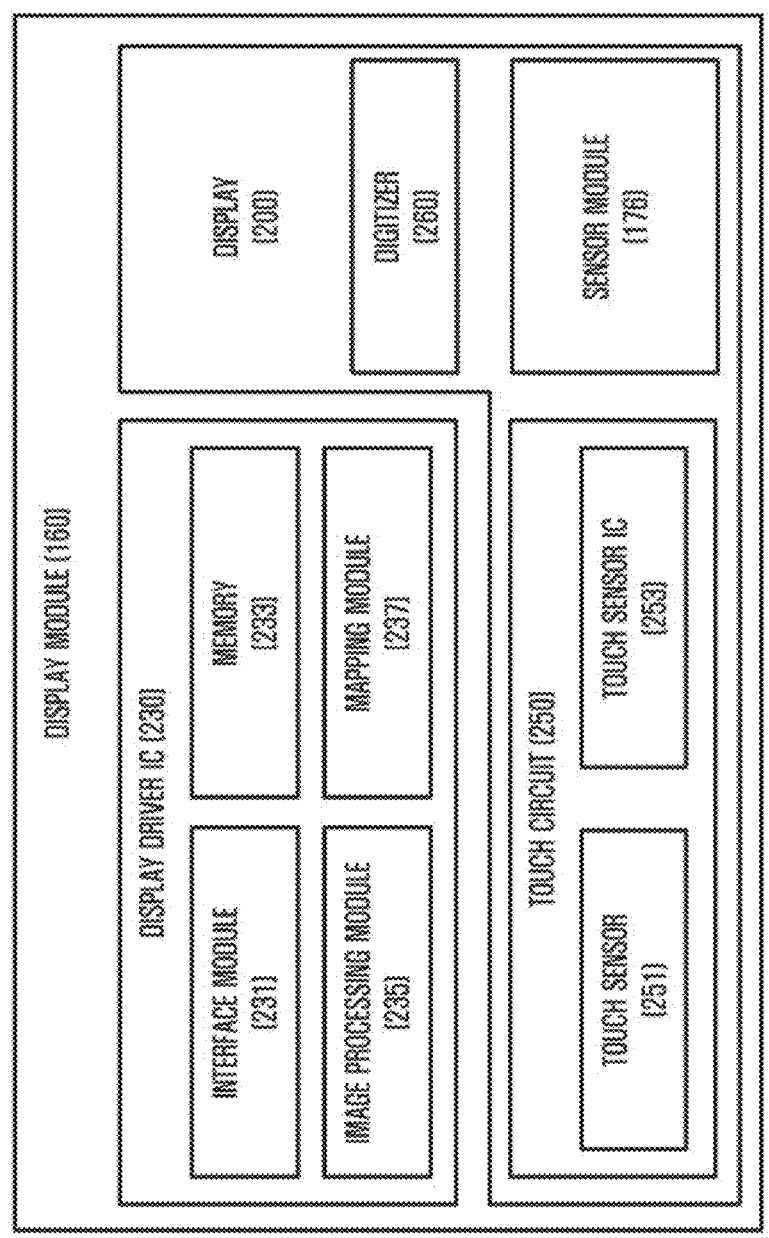
FIG. 2 is a block diagram illustrating a display module according to various embodiments.

FIG. 2 is a block diagram illustrating the display module according to various embodiments.

Referring to FIG. 2, the display module 160 may include a display 200 and a display driver IC 230 (hereinafter, referred to as a 'DDI 230') configured to control the display 200.

The DDI 230 may include an interface module 231, a memory 233 (for example, a buffer memory), an image processing module 235, and/or a mapping module 237.

According to an embodiment, the DDI 230 may receive image data or image information including an image control signal corresponding to a command for controlling the image data from another element of the electronic device 101 through the interface module 231.

According to an embodiment, the image information may be received from a processor (for example, the processor 120 of FIG. 1) (for example, the main processor 121 of FIG. 1) (for example, an application processor) or an auxiliary processor (for example, the auxiliary processor 123 of FIG. 1) (for example, a graphics processing unit) operating independently from the function of the main processor 121.

According to an embodiment, the DDI 230 may communicate with a touch circuit 250 or the sensor module 176 through the interface module 231. Further, the DDI 230 may store at least some of the received image information in the memory 233. In an example, the DDI 230 may store at least some of the received image information in the memory 233 in units of frames.

According to an embodiment, the image processing module 235 may preprocess or postprocess at least some of the image data (for example, control a resolution, a brightness, or a size) on the basis of at least characteristics of the image data or characteristics of the display 200.

According to an embodiment, the mapping module 237 may generate a voltage value or a current value corresponding to the preprocessed or postprocessed image data through the image processing module 235. In an embodiment, the generation of the voltage value or the current value may be performed on the basis of, for example, at least some of the attributes of pixels of the display 200 (for example, arrangement of the pixels (RGB stripe or pentile structure).

In an embodiment, at least some pixels of the display 200 may be operated on the basis of at least some of the voltage value or the current value, and thus visual information (for example, text, images, and/or icons) corresponding to the image data may be displayed through the display 200.

According to an embodiment, the display module 160 may further include a touch circuit 250. The touch circuit 250 may include a touch sensor 251 and a touch sensor IC 253 configured to control the same.

In an embodiment, the touch sensor IC 253 may control the touch sensor 251 to detect a touch input or a hovering input for a specific location of the display 200. For example, the touch sensor IC 253 may detect the touch input or the hovering input by measuring a change in a signal (for example, voltage, an amount of light, resistance, or an amount of charge) for the specific location of the display 200. The touch sensor IC 253 may provide the processor (for example, the processor 120 of FIG. 1) with information on the detected touch input or hovering input (for example, location, area, pressure, or time).

According to an embodiment, at least some of the touch circuit 250 (for example, the touch sensor IC 253) may be included as a part of the display driver IC 230 or the display 200.

According to an embodiment, at least some of the touch circuit 250 (for example, the touch sensor IC 253) may be included as a part of another element (for example, the auxiliary processor 123) arranged outside the display module 160.

According to an embodiment, the display module 160 may further include at least one sensor (for example, an expansion detection sensor, a fingerprint sensor, an iris sensor, a pressure sensor, or an illumination sensor) of the sensor module 176 or a control circuit therefor. In this case, the at least one sensor or the control circuit therefor may be embedded into a part of the display module 160 (for example, the display 200 or the DDI 230) or a part of the touch circuit 250. For example, when the sensor module 176 embedded into the display module 160 includes a biometric sensor (for example, a fingerprint sensor), the biometric sensor may acquire biometric information (for example, a fingerprint image) associated with a touch input through some areas of the display 200. In another example, when the sensor module 176 embedded into the display module 160 includes a pressure sensor, the pressure sensor may acquire pressure information associated with a touch input through some or all areas of the display 200. In another example, when the sensor module 176 embedded into the display module 160 includes an expansion detection sensor, the expansion detection sensor may sense a change in the area (for example, the screen size) of the display (for example, a variable display). According to an embodiment, the touch sensor 251 or the sensor module 176 may be arranged between pixels of a pixel layer of the display 200 or above or below the pixel layer.

According to an embodiment, the display 200 may include a digitizer 260 configured to detect an input (for example, a touch input or a hovering input) of an input device (for example, a stylus pen). The digitizer 260 may convert analog coordinates of the input device (for example, the stylus pen) into digital data and transfer the digital data to the processor (for example, the processor 120 of FIG. 1). The processor (for example, the processor 120 of FIG. 1) may detect an input (for example, a touch input or a hovering input) through the input device (for example, the stylus pen) on the basis of digital data input from the digitizer 260.

Figure 3:
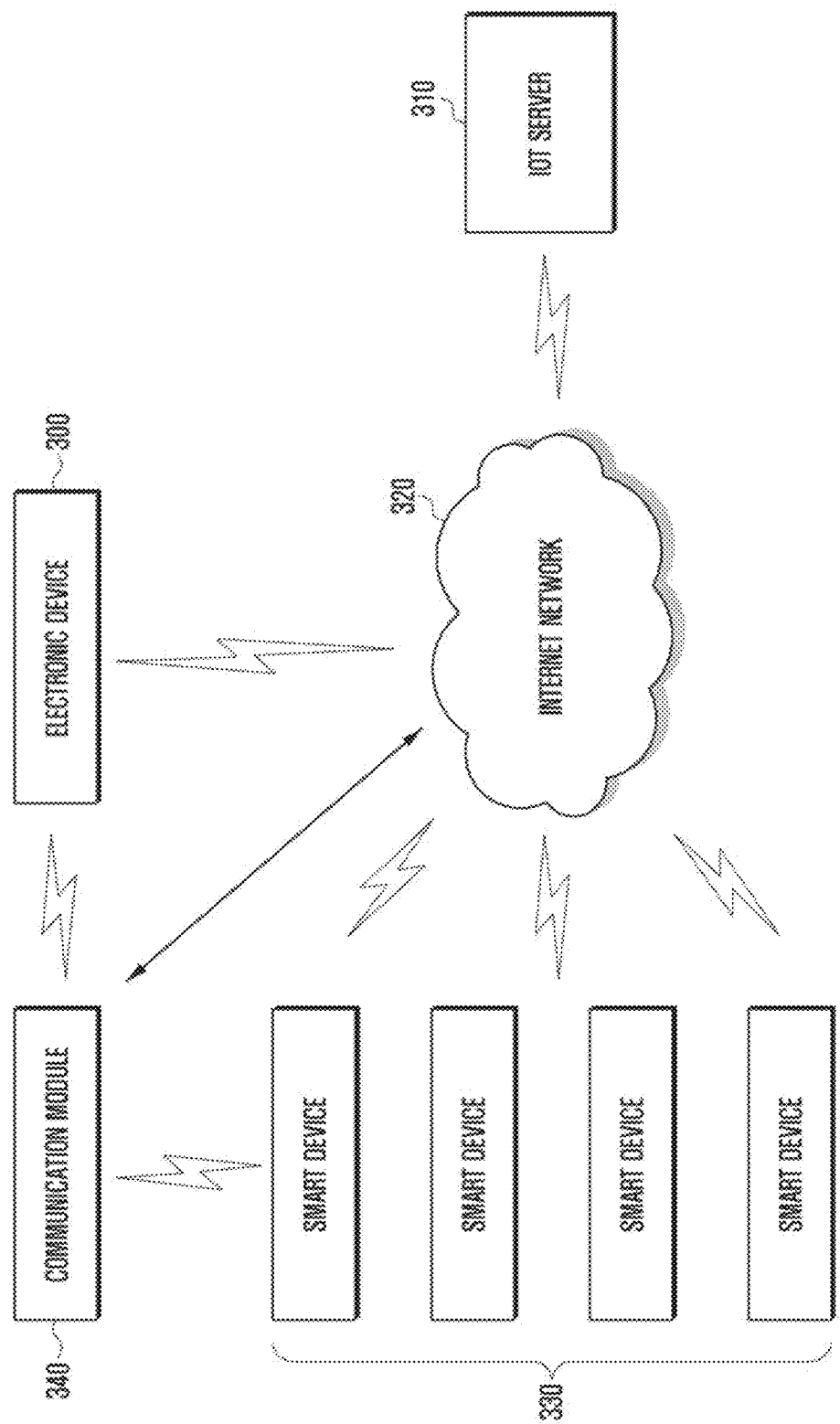
FIG. 3 illustrates the control of a plurality of smart devices through the electronic device in a smart control system according to various embodiments.

FIG. 3 illustrates the control of a plurality of smart devices through the electronic device in a smart control system according to various embodiments.

Referring to FIG. 3, a smart control system according to various embodiments may include at least one electronic device 300 (for example, smartphones) (for example, the electronic device 101 of FIG. 1, an Internet of Things (IOT) server 310, an Internet network 320 (for example, an IOT communication network), a plurality of smart devices 330 (for example, mobile devices, wearable devices, display devices, audio devices, household appliances, light devices, smart home devices, and smart sensors), and a communication module 340 (for example, a short-range communication network module, a Wi-Fi module, or a Bluetooth module). In some embodiments, the communication module 340 may be, for example, an access point in a home or office.

According to an embodiment, the electronic device 300 may be connected to the Internet network 320 (for example, a long-range communication network) through a wireless or a wired communication scheme. The electronic device 300 may be connected to the IOT server 310 through the Internet network 320.

According to an embodiment, the electronic device 300 may be connected to the communication module 340 through a wireless or a wired communication scheme. The electronic device 300 may be connected to the plurality of smart devices 330 through the communication module 340. The electronic device 300 may be connected to the IOT server 310 through the communication module 340.

According to an embodiment, the IOT server 310 may be connected to the Internet network 320 through a wired or a wireless communication scheme. The IOT server 310 may be connected to the electronic device 300 and the plurality of smart devices 330 through the Internet network 320.

According to an embodiment, at least some of the plurality of smart devices 330 may be connected to the Internet network 320. At least some of the plurality of smart devices 330 may be connected to the electronic device 300 and the IOT server 310 through the Internet network 320.

According to an embodiment, at least some of the plurality of smart devices 330 may be connected to the communication module 340. At least some of the plurality of smart devices 330 may be connected to the electronic device 300 and the IOT server 310 through the communication module 340.

According to an embodiment, the electronic device 300 may recognize user schedules through the processor and register the user schedules (for example, store the user schedules in the memory). The electronic device 300 may provide the pre-registered user schedules to the IOT server 310. The electronic device 300 may generate a control interface configured to control the operations of the plurality of smart devices 330 according to the user schedules through the processor. In an embodiment, the electronic device 300 may provide the generated control interface to the IOT server 310. In an embodiment, the IOT server 310 may store the control interface provided from the electronic device 300 in the memory. The IOT server 310 may provide the control interface to the electronic device 300 or another electronic device according to the user schedules through the processor.

In an embodiment, the IOT server 310 may include a processor configured to recognize user schedules and generate a control interface for controlling the operations of the plurality of smart devices 330 according to the user schedules. In an embodiment, the IOT server 310 may include a memory configured to store user schedules, the control information, and instructions for generating the control interface.

According to an embodiment, the electronic device 300 may register the user schedules and provide the pre-registered user schedules to the IOT server 310. The IOT server 310 may generate a control interface for controlling the operations of the plurality of smart devices 330 according to the registered user schedules. In an embodiment, the IOT server 310 may store the generated control interface and provide the control interface to the electronic device 300 or another electronic device according to the user schedules.

According to an embodiment, the electronic device 300 may generate a control interface for controlling the operations of the plurality of smart devices 330 according to the user schedules. The electronic device 300 may control the operations of the plurality of smart devices 330 through the control interface. In an embodiment, the electronic device 300 may include a processor configured to recognize the user schedules and generate a control interface for controlling the operations of the plurality of smart devices 330 according to the user schedules. In an embodiment, the electronic device 300 may include a memory configured to store the user schedules, the control interface, and instructions for generating the control interface.

According to an embodiment, the IOT server 310 may generate a control interface for controlling the operations of the plurality of smart devices 330 according to the user schedules and provide the control interface to the electronic device 300. The electronic device 300 may control the operations of the plurality of smart devices 330 through the control interface provided from the IOT server 310.

FIG. 3 illustrates that one electronic device 300 is provided. However, the disclosure is not limited thereto, and in some embodiments, a plurality of electronic devices 300 may be provided. In FIG. 3, at least some of the electronic device 300, the communication module 340, and the plurality of smart devices 330 may be located within a predetermined space (for example, home or office). However, the disclosure is not limited thereto, and in some embodiments, a plurality of electronic devices 300 may be located within a predetermined space (for example, home or office). In some embodiments, the electronic device 300, the communication module 340, the plurality of smart devices 330, the Internet network 320 and the IOT server 310 may be located in a predetermined space (for example, a home or office).

According to an embodiment, at least one electronic device 300 may be connected to the IOT server 310, the communication module 340, and/or the plurality of smart devices 330 through a communication scheme in which wired and wireless types are combined as well as a wired communication scheme or a wireless communication scheme.

According to an embodiment, at least one electronic device 300 and the plurality of smart devices 330 may be connected through a device-to-device (D2D) scheme.

According to an embodiment, at least one electronic device 300 may control the operations of the plurality of smart devices 330 on the basis of a user selection input through the touch sensor. In an embodiment, at least one electronic device 300 may activate the control interface according to the user selection input through the touch sensor and control the operations of the plurality of smart devices 330 through the control interface.

According to an embodiment, at least one electronic device 300 may control the operations of the plurality of smart devices 330 on the basis of user selection input through an electronic pen (for example, a stylus pen). In an embodiment, at least one electronic device 300 may activate the control interface according to the user selection input through the electronic pen (for example, the stylus pen) and control the operations of the plurality of smart devices 330 through the control interface.

According to an embodiment, at least one electronic device 300 may control the operations of the plurality of smart devices 330 by recognizing a user utterance. In an embodiment, at least one electronic device 300 may activate the control interface by recognizing the user utterance and control the operations of the plurality of smart devices 330 through the control interface.

Figure 4:
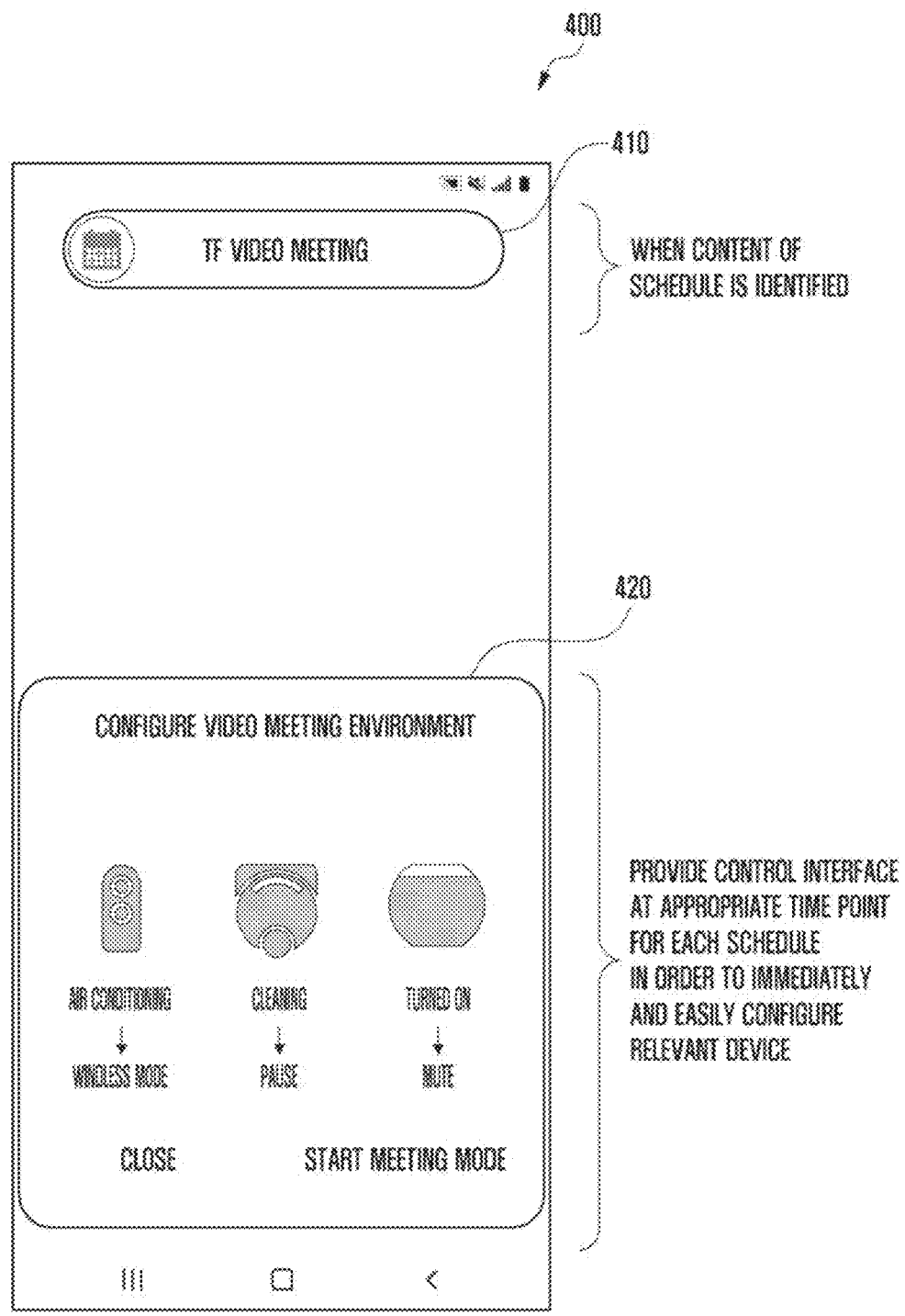
FIG. 4 illustrates that user schedules are identified using the electronic device and the control interface for controlling the operations of the plurality of smart devices according to the user schedules is provided, according to some embodiments.

FIG. 4 illustrates that user schedules are identified using the electronic device and the control interface for controlling the operations of the plurality of smart devices according to the user schedules is provided.

Referring to FIG. 4, according to an embodiment, an electronic device 400 (for example, the electronic device 101 of FIG. 1 or the electronic device 300 of FIG. 3) may display content of one or more pre-registered user schedules through a calendar schedule function 410. In an embodiment, the electronic device 400 may display the content of the one or more user schedules on the display and output the same through a sound in order to allow the user to visually and acoustically identify the one or more user schedules.

According to an embodiment, the electronic device 400 may activate a control interface 420 for controlling the operations of the plurality of smart devices linked to the one or more user schedules according to the user schedules. The electronic device 400 may make the operation of each of the plurality of smart devices controlled through the control interface 420.

In an embodiment, when a task force (TF) video meeting is registered as a user schedule, the electronic device 400 may determine whether the start time of the video meeting (for example, a target time point) has come (or has entered the target time point). When the start time of the video meeting occurs, the electronic device 400 displays a message indicating the start of the TF video meeting and determines a plurality of smart devices to operate through a link to the TF video meeting.

The electronic device 400 may activate the control interface 420 for controlling the operations of the plurality of smart devices to operate through the link to the TF video meeting and control the operations of the plurality of smart devices linked to the TF video meeting through the control interface 420. For example, the operation of an air conditioner is changed to a windless mode, the operation of a robot cleaner is stopped, and the operation of an IOT speaker is changed to a turn-on state.

The electronic device 400 according to various embodiments may provide a customized control interface for controlling the operations of smart devices having a high usage correlation with the one or more user schedules on the basis of calendar schedules. The electronic device 400 may provide the customized control interface for preemptively controlling the operations of the smart devices according to each time point related to the one or more user schedules (for example, before the start of the user schedule, at the start of the user schedule, during the user schedule, or after the end of the user schedule).

Figure 5:
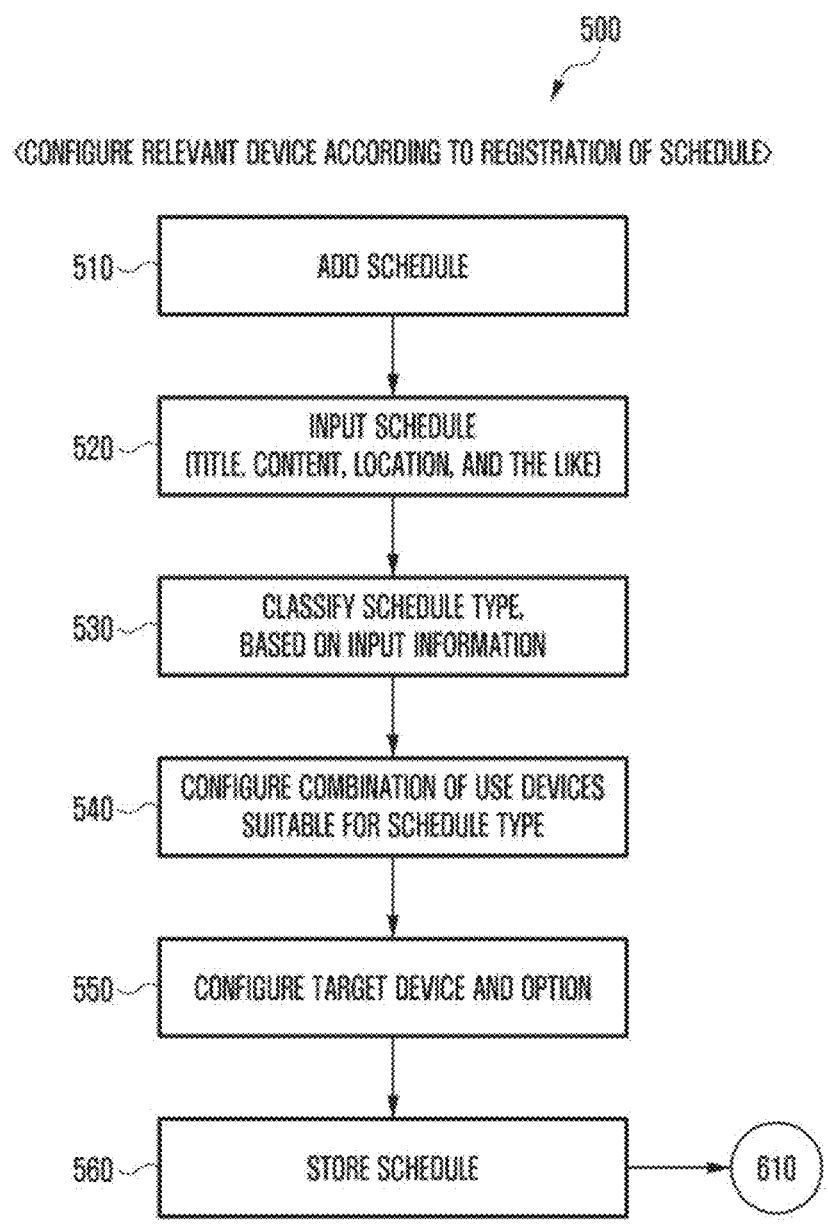
FIG. 5 illustrates a method of configuring smart devices according to registration of user schedules, according to some embodiments.

FIG. 5 is a diagram 500 illustrating a method of configuring smart devices according to registration of user schedules.

Referring to FIG. 5, according to an embodiment, the electronic device (for example, the electronic device 300 of FIG. 3 or the electronic device 400 of FIG. 4) according to various embodiments may configure devices (for example, the plurality of smart devices 330 of FIG. 3) having a high correlation according to registration of user schedules.

In operation 510, the electronic device (for example, the electronic device 300 of FIG. 3 or the electronic device 400 of FIG. 4) according to various embodiments may initiate addition of a user schedule.

In operation 520, the electronic device (for example, the electronic device 300 of FIG. 3 or the electronic device 400 of FIG. 4) according to various embodiments may input user schedule information. For example, the user schedule information may include information on a title of the schedule, content of the schedule, and a location at which the schedule is conducted, etc.

In operation 530, the electronic device (for example, the electronic device 300 of FIG. 3 or the electronic device 400 of FIG. 4) according to various embodiments may classify a type of the user schedule on the basis of the input user schedule information.

In an embodiment, the electronic device (for example, the electronic device 300 of FIG. 3 or the electronic device 400 of FIG. 4) may classify the type of the user schedule as shown in [Table 1].

TABLE 1

| Identification keyword based on schedule information (identification keyword is predefined, and can be individually added by user or automatically added by AI) | #video meeting #online meeting #home meeting #WIFI #LAN cable meeting #home working | #home training #home workout #home pilates #home health #home stretching | #travel #holiday #summer vacation #winter vacation #day travel #healing travel #Jeju travel #Gangneung travel | #watching movie #watching soap opera #watching soccer game #watching baseball game #watching Olympic game #watching World Cup game #watching premiere |
| --- | --- | --- | --- | --- |
| Schedule type | Home working | Home training | Travel | Watching content |
| Identification keyword based on schedule information (identification keyword is predefined, and can be individually added by user or automatically added by AI) | #study #examination period #preparing for mid-term exam #preparing for final exam #preparing for quiz #homework | #nap #catnap #sleeping hours for nap #take nap #nap #catnap #slumber | #put sb down | #home cooking #preparing dinner #preparing lunch #preparing breakfast #preparing party food |
| Schedule type | Home study | sleep | | cooking |

In an embodiment, the electronic device (for example, the electronic device 300 of FIG. 3 or the electronic device 400 of FIG. 4) may classify the plurality of smart devices according to each user schedule type on the basis of an identification keyword based on the user schedule. For example, the identification keyword may be predefined and may be individually added according to a user selection. For example, the identification keyword may be automatically added by artificial intelligence (AI).

In an embodiment, the electronic device (for example, the electronic device 300 of FIG. 3 or the electronic device 400 of FIG. 4) may classify the plurality of smart devices according to each user schedule type on the basis of the user schedule such as home working, home training, travel, watching content, home study, sleep, or cooking. In some embodiments, each of the plurality of smart devices may be associated with one or more user schedule types that are relevant to the smart device. For example, home working may be associated with an air conditioner, a stereo, and/or lighting; travel may be associated with a security system and/or robot cleaner; cooking may be associated with an oven and/or a refrigerator, etc.

In operation 540, the electronic device (for example, the electronic device 300 of FIG. 3 or the electronic device 400 of FIG. 4) according to various embodiments may configure a combination of usage devices (for example, the plurality of smart devices 330 of FIG. 3) suitable for the user schedule type.

In an embodiment, the electronic device (for example, the electronic device 300 of FIG. 3 or the electronic device 400 of FIG. 4) may combine and configure smart devices suitable for the user schedule type as shown in [Table 2].

TABLE 2

| Device/schedule type | Home working | Home training | travel | Watching content | Home study | sleep | cooking |
| --- | --- | --- | --- | --- | --- | --- | --- |
| mobile | Turned on | Turned on | Turned on (optimized for app) | Turned on | Turned on | — | — |
| Tablet | Turned on | — | — | — | Turned on | — | — |
| Watch | — | Exercise mode | — | — | — | — | — |
| Buds | Connected | — | Connected | — | Connected | — | — |
| Speaker | Mute | Turned on | Mute | Mute | — | Turned off | Turned on |
| Washing machine | Laundry reserved | Sports wear | Laundry reserved | — | — | — | — |
| Drying machine | Laundry reserved | — | Laundry reserved | — | — | — | — |
| Steam closet | — | Sports wear | — | — | — | — | — |
| Shoes cleaner | — | Sports wear | — | — | — | — | — |
| Robot cleaner | Pause | — | — | — | Pause | Stop | — |
| Oven | — | — | — | — | — | — | preheating |

TABLE 2-continued

| Device/schedule type | Home working | Home training | travel | Watching content | Home study | sleep | cooking |
|---|---|---|---|---|---|---|---|
| Air conditioner | Windless | Air conditioning | Turned off (reservation canceled) | Air conditioning | Windless | Windless | — |
| Air purifier | Windless | Turned on | Turned off (reservation canceled) | — | Windless | Windless | Turned off |
| TV | Turned off | Turned on | — | Sports mode | Turned off | Turned off | — |
| Sound bar (audio) | — | — | — | Sports mode | — | — | — |
| Light | — | Brightening | — | — | — | Turned off | — |
| Home CCTV | — | — | Turned on | — | — | — | — |
| Open/close sensor | — | — | Turned on | — | — | — | — |
| Human body detection sensor | — | — | Turned on | — | — | — | — |
| Smoke detector | — | — | Turned on | — | — | — | — |
| Leakage detection sensor | — | — | Turned on | — | — | — | — |

In an embodiment, the electronic device (for example, the electronic device 300 of FIG. 3 or the electronic device 400 of FIG. 4) may combine and configure smart devices suitable for the user schedule type according to the user schedule such as home working, home training, travel, watching content, home study, sleep, or cooking. For example, a security system and robot cleaner may be configured to turn on when the user schedule is a traveling user type; an air conditioner may be configured to a certain temperature, a stereo may be configured to change to a given station, and/or lighting may be configured to turn on when home working, etc.

In operation 550, the electronic device (for example, the electronic device 300 of FIG. 3 or the electronic device 400 of FIG. 4) according to various embodiments may select smart devices to operate through the link to the user schedule as target devices and configure the option of the smart devices selected as the target devices.

In operation 560, the electronic device (for example, the electronic device 300 of FIG. 3 or the electronic device 400 of FIG. 4) according to various embodiments may store the user schedules in the memory.

In an embodiment, the electronic device (for example, the electronic device 300 of FIG. 3 or the electronic device 400 of FIG. 4) according to various embodiments may store the user schedules in an internal memory of the electronic device and provide the user schedules to the IOT server (for example, the IOT server 310 of FIG. 1).

For example, the IOT server (for example, the IOT server 310 of FIG. 3) may store the user schedules provided from the electronic device (for example, the electronic device 300 of FIG. 3 or the electronic device 400 of FIG. 4) in an internal memory of the IOT server (for example, the IOT server 310 of FIG. 3).

At least some of the operations illustrated in FIG. 5 may be omitted. Before or after at least some of the operations illustrated in FIG. 5, at least some operations mentioned with reference to other drawings of the disclosure may be added and/or inserted. The operations illustrated in FIG. 5 may be performed by the processor (for example, the processor 120 of FIG. 1) of the electronic device (for example, the electronic device 101 of FIG. 1, the electronic device 300 of FIG. 3, or the electronic device 400 of FIG. 4) or the processor of the IOT server (for example, the IOT server 310 of FIG. 3). For example, the memory of the electronic device (for example, the electronic device 101 of FIG. 1, the electronic device 300 of FIG. 3, or the electronic device 400 of FIG. 4) or the IOT server (for example, the IOT server 310 of FIG. 3) may store instructions causing the processor to, when executed, perform at least some operations illustrated in FIG. 5.

Figure 6:
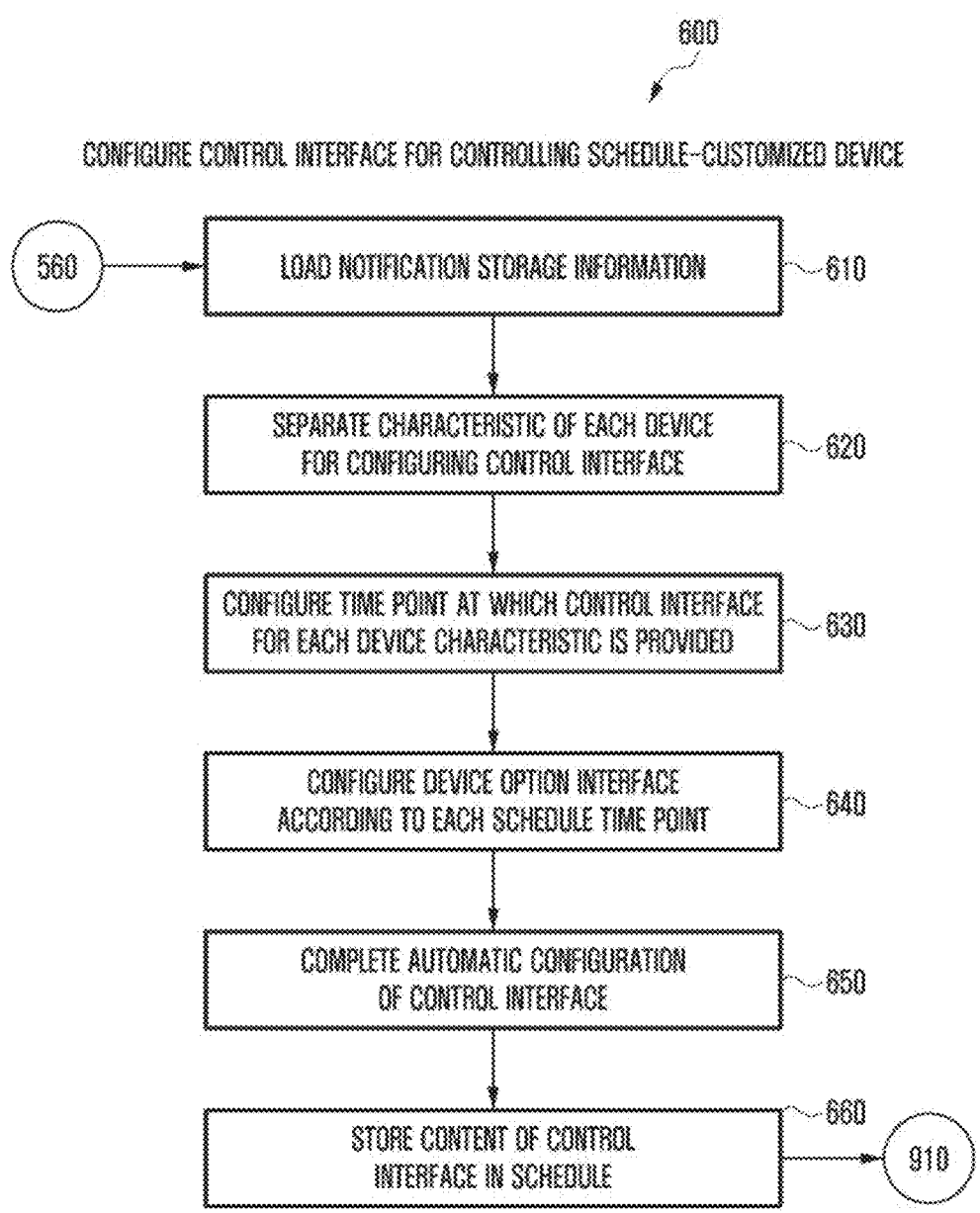
FIG. 6 illustrates an example of the configuration of a control interface for controlling operations of smart devices according to user schedules, according to some embodiments.

FIG. 6 illustrates an example of the configuration of a control interface for controlling operations of smart devices according to user schedules.

Referring to FIG. 6, according to an embodiment, the electronic device (for example, the electronic device 300 of FIG. 3 or the electronic device 400 of FIG. 4) according to various embodiments may configure a control interface according to a user schedule. In another embodiment, the IOT server (for example, the IOT server 310 of FIG. 3) may configure a control interface according to a user schedule.

In operation 610, in an embodiment, the electronic device (for example, the electronic device 300 of FIG. 3 or the electronic device 400 of FIG. 4) according to various embodiments may read information (for example, notification storage information) for a notification of the user schedule from the memory. In another embodiment, the electronic device (for example, the electronic device 300 of FIG. 3 or the electronic device 400 of FIG. 4) may receive the information for the notification of the user schedule from the IOT server (for example, the IOT server 310 of FIG. 3).

In operation 620, the electronic device (for example, the electronic device 300 of FIG. 3 or the electronic device 400 of FIG. 4) according to various embodiments may distinguish characteristics of devices (for example, the plurality of smart devices 330 of FIG. 3) for configuring the control interface. In another embodiment, the IOT server (for example, the IOT server 310 of FIG. 3) may distinguish characteristics of devices (for example, the plurality of smart devices 330 of FIG. 3) for configuring the control interface.

In an embodiment, the electronic device (for example, the electronic device 300 of FIG. 3 or the electronic device 400 of FIG. 4) may distinguish characteristics of devices (for example, the plurality of smart devices 330 of FIG. 3) for configuring the control interface as shown in [Table 3].

TABLE 3

| Device | Device characteristic | | |
|---|---|---|---|
| | mobility | (wired/wireless) charging required | Public device or not |
| Mobile | o | (wireless) o | Personal |
| Tablet | o | (wireless) o | Personal |
| Watch | o | (wireless) o | Personal |
| Buds | o | (wireless) o | Personal |
| Speaker | fixed | (wired/wireless) x/o | Public |
| Washing machine | fixed | (wired) x | Public |
| Drying machine | fixed | (wired) x | Public |
| Steam closet | fixed | (wired) x | Public |
| Shoes cleaner | fixed | (wired) x | Public |
| Robot cleaner | fixed | (wireless) o | Public |
| Oven | fixed | (wired) x | Public |
| Air conditioner | fixed | (wired) x | Public |
| Air purifier | fixed | (wired) x | Public |
| TV | fixed | (wired) x | Public |
| Sound bar (audio) | fixed | (wired) x | Public |
| Light | fixed | (wired) x | Public |

As another example, operation 620 may be performed by the IOT server (for example, the IOT server 310 of FIG. 3).

At least some of the operations illustrated in FIG. 6 may be omitted. Before or after at least some of the operations illustrated in FIG. 6, at least some operations mentioned with reference to other drawings of the disclosure may be added and/or inserted. The operations illustrated in FIG. 6 may be performed by the processor (for example, the processor 120 of FIG. 1) of the electronic device (for example, the electronic device 101 of FIG. 1, the electronic device 300 of FIG. 3, or the electronic device 400 of FIG. 4) or the processor of the IOT server (for example, the IOT server 310 of FIG. 3). For example, the memory of the electronic device (for example, the electronic device 101 of FIG. 1, the electronic device 300 of FIG. 3, or the electronic device 400 of FIG. 4) or the IOT server (for example, the IOT server 310 of FIG. 3) may store instructions causing the processor to, when executed, perform at least some operations illustrated in FIG. 6.

Figure 7:
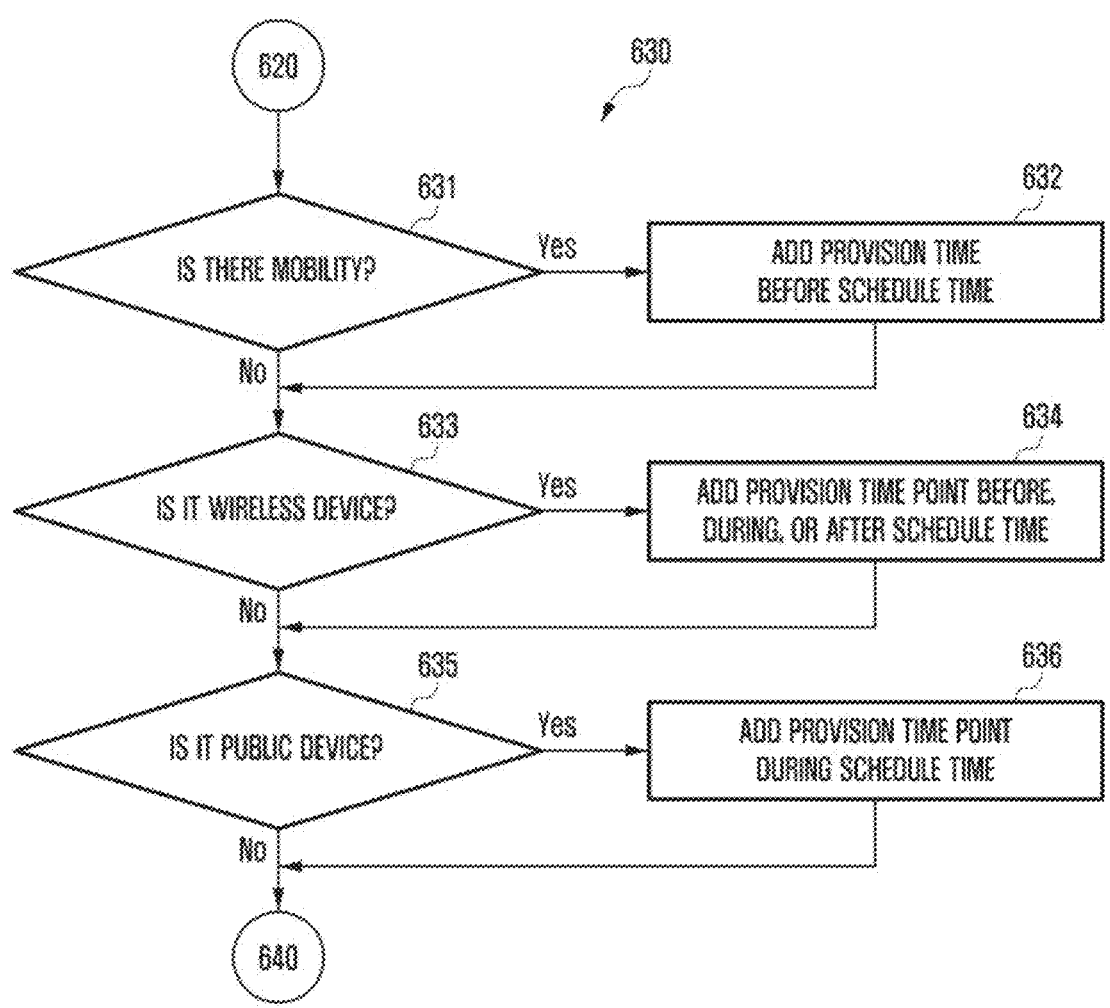
FIG. 7 illustrates an example of the configuration of a time point at which a control interface is provided for each characteristic of devices (for example, smart devices), according to some embodiments.

FIG. 7 illustrates an example of the configuration of a time point at which a control interface is provided for each characteristic of devices (for example, smart devices).

Referring to FIGS. 6 and 7, in operation 631, the electronic device (for example, the electronic device 300 of FIG. 3 or the electronic device 400 of FIG. 4) may determine whether a plurality of smart devices (for example, the plurality of smart devices 330 of FIG. 3) have mobility as shown in [Table 4].

When there are smart devices having mobility among the plurality of smart devices 330 on the basis of the determination result of operation 631, the electronic device (for example, the electronic device 300 of FIG. 3 or the electronic device 400 of FIG. 4) may add a provision time point before the user schedule time to the smart devices having mobility among the plurality of smart devices 330 in operation 633. Operation 633 may be performed after operation 632.

TABLE 4

| Characteristic of each device/schedule time point | Before schedule | Start of schedule | During schedule | After schedule |
|---|---|---|---|---|
| Mobility | In same space? | In same space? | — | — |
| Wireless (charging) | Is charging required? | — | Is battery sufficient? | Is charging required? |
| Public | — | — | Is state changed (by another user) | — |

When there is no smart device having mobility among the plurality of smart devices 330 on the basis of the determination result of operation 631, the electronic device (for example, the electronic device 300 of FIG. 3 or the electronic device 400 of FIG. 4) may determine whether the smart devices 330 are wireless devices as shown in [Table 4] in operation 633.

When the smart devices 330 are wireless devices on the basis of the determination result of operation 633, the electronic device (for example, the electronic device 300 of FIG. 3 or the electronic device 400 of FIG. 4) may add provision time points before, during, and after the user schedule in operation 634. Operation 635 may be performed after operation 634.

When the smart devices 330 are not wireless devices on the basis of the determination result of operation 633, the electronic device (for example, the electronic device 300 of FIG. 3 or the electronic device 400 of FIG. 4) may determine whether the smart devices 330 are public devices as shown in [Table 4] in operation 635.

When the smart devices 330 are public devices on the basis of the determination result of operation 635, the electronic device (for example, the electronic device 300 of FIG. 3 or the electronic device 400 of FIG. 4) may add the provision time during the user schedule time in operation 636.

When the smart devices 330 are not public devices on the basis of the determination result of operation 635, the electronic device (for example, the electronic device 300 of FIG. 3 or the electronic device 400 of FIG. 4) may perform operation 640.

In another embodiment, operation 631 to operation 635 may be performed by the IOT server (for example, the IOT server 310 of FIG. 3).

At least some of the operations illustrated in FIG. 7 may be omitted. Before or after at least some of the operations illustrated in FIG. 7, at least some operations mentioned with reference to other drawings of the disclosure may be added and/or inserted. The operations illustrated in FIG. 7 may be performed by the processor (for example, the processor 120 of FIG. 1) of the electronic device (for example, the electronic device 101 of FIG. 1, the electronic device 300 of FIG. 3, or the electronic device 400 of FIG. 4) or the processor of the IOT server (for example, the IOT server 310 of FIG. 3). For example, the memory of the electronic device (for example, the electronic device 101 of FIG. 1, the electronic device 300 of FIG. 3, or the electronic device 400 of FIG. 4) or the IOT server (for example, the IOT server 310 of FIG. 3) may store instructions causing the processor to, when executed, perform at least some operations illustrated in FIG. 7.

FIG. 8 illustrates an example of the configuration of an option interface of devices (for example, smart devices) for each time point of the user schedule.

Referring to FIGS. 6 and 8, in operation 640, the electronic device (for example, the electronic device 300 of FIG. 3 or the electronic device 400 of FIG. 4) may configure an option interface of devices (for example, the plurality of smart devices 330 of FIG. 3) for each user schedule time point.

In an embodiment, the electronic device (for example, the electronic device 300 of FIG. 3 or the electronic device 400 of FIG. 4) may configure the option interface of the plurality of smart devices 330 depending on whether it is before the user schedule starts, a start time point of the user schedule, it is during the user schedule, or it is after the user schedule.

As another example, operation 640 may be performed by the IOT server (for example, the IOT server 310 of FIG. 3).

In operation 650, the electronic device (for example, the electronic device 300 of FIG. 3 or the electronic device 400 of FIG. 4) may complete the automatic configuration of a control interface (for example, the control interface 420 of FIG. 4) for controlling the operations of the plurality of smart devices 330 according to the user schedule.

As another example, operation 650 may be performed by the IOT server (for example, the IOT server 310 of FIG. 3).

In operation 660, the electronic device (for example, the electronic device 300 of FIG. 3 or the electronic device 400 of FIG. 4) may store content of the control interface (for example, the control interface 420 of FIG. 4) in the user schedule.

As another example, operation 660 may be performed by the IOT server (for example, the IOT server 310 of FIG. 3).

Figure 9:
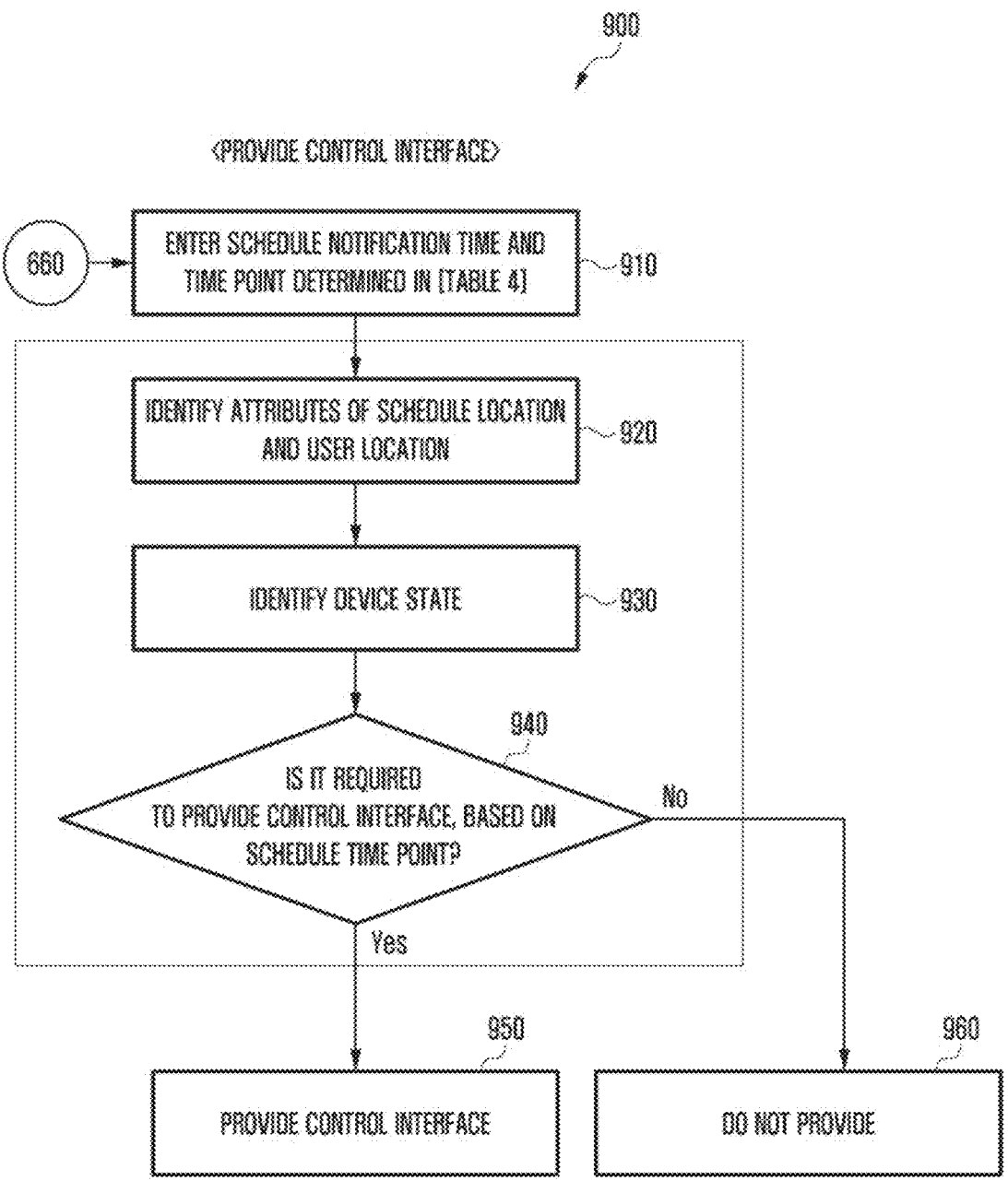
FIG. 9 illustrates an example of provision of a control interface for controlling operations of smart devices according to user schedules, according to some embodiments.

FIG. 9 illustrates an example of provision of a control interface for controlling operations of smart devices according to user schedules.

Referring to FIGS. 6 and 9, according to an embodiment, the electronic device (for example, the electronic device 300 of FIG. 3 or the electronic device 400 of FIG. 4) according to various embodiments may provide a control interface (for example, the control interface 420 of FIG. 4). In another embodiment, the IOT server (for example, the IOT server 310 of FIG. 3) may provide the control interface (for example, the control interface 420 of FIG. 4).

In operation 910, the electronic device (for example, the electronic device 300 of FIG. 3 or the electronic device 400 of FIG. 4) may enter a notification time of the user schedule and the user schedule time point shown in [Table 4] (for example, before the user schedule, the start time point of the user schedule, during the user schedule, or after the user schedule).

As another example, operation 910 may be performed by the IOT server (for example, the IOT server 310 of FIG. 3).

In operation 920, the electronic device (for example, the electronic device 300 of FIG. 3 or the electronic device 400 of FIG. 4) may identify attributes of the location at which the user schedule is conducted and the user location.

In an embodiment, the electronic device (for example, the electronic device 300 of FIG. 3 or the electronic device 400 of FIG. 4) may identify the attributes of the location at which the user schedule is conducted and the user location as shown in [Table 5].

TABLE 5

| Schedule location attributes | User location (based on mobile phone) | Whether schedule attributes match user location |
| --- | --- | --- |
| Schedule within home | Within home | Match |
| | Outside home | Non-match |
| | Unidentified | Non-match |
| Schedule outside home | Within home | Non-match |
| | Outside home | Match |
| | Unidentified | Non-match |
| none | Within home/outside home/unidentified | none |

As another example, operation 920 may be performed by the IOT server (for example, the IOT server 310 of FIG. 3).

In operation 930, the electronic device (for example, the electronic device 300 of FIG. 3 or the electronic device 400 of FIG. 4) may identify states of target devices (for example, the plurality of smart devices 330 of FIG. 3).

In an embodiment, the electronic device (for example, the electronic device 300 of FIG. 3 or the electronic device 400 of FIG. 4) or the IOT server (for example, the IOT server 310 of FIG. 3) may identify states of the plurality of smart devices 330 according to each time point of the user schedules (for example, before the schedule, the start of the schedule, during the schedule, or after the schedule) as shown in [Table 6]. For example, the electronic device (for example, the electronic device 300 of FIG. 3 or the electronic device 400 of FIG. 4) or the IOT server (for example, the IOT server 310 of FIG. 3) may configure a device option interface according to each schedule time point and determine whether current states of the target devices (for example, the plurality of smart devices 330 of FIG. 3) at each time point are different from preset states. For example, when the current states of the target devices (for example, the plurality of smart devices 330 of FIG. 3) at each time point are different from the preset states, the electronic device (for example, the electronic device 300 of FIG. 3 or the electronic device 400 of FIG. 4) or the IOT server (for example, the IOT server 310 of FIG. 3) may provide a device option interface according to each schedule time point. For example, when the current states of the target devices (for example, the plurality of smart devices 330 of FIG. 3) at each time point are not different from the preset states, the electronic device (for example, the electronic device 300 of FIG. 3 or the electronic device 400 of FIG. 4) or the IOT server (for example, the IOT server 310 of FIG. 3) may not provide the option interface according to each schedule time point.

TABLE 6

| | Whether to provide control interface according to device state at each schedule time point | | | |
| --- | --- | --- | --- | --- |
| p | Before schedule | Start of schedule | During schedule | After schedule |
| Match/none | Is configuration of device option interface according to each schedule time point different from target device state at each time point → provide if different → omit if same | | | |
| Non-match | | provide | omit | omit |

As another example, operation 930 may be performed by the IOT server (for example, the IOT server 310 of FIG. 3).

In operation 940, the IOT server (for example, the IOT server 310 of FIG. 3) may determine whether provision of a control interface for controlling operations of the plurality of smart devices 330 is needed on the basis of a user schedule time point (for example, before the start of the user schedule, at the time point at the user schedule starts, during the user schedule, or after the user schedule).

As another example, operation 940 may be performed by the electronic device (for example, the electronic device 300 of FIG. 3 or the electronic device 400 of FIG. 4).

When provision of the control interface for controlling the operations of the plurality of smart devices 330 is needed on the basis of the determination result of operation 940, the IOT server (for example, the IOT server 310 of FIG. 3) may provide the control interface for controlling the operations of the plurality of smart devices 330 to the electronic device (for example, the electronic device 300 of FIG. 3 or the electronic device 400 of FIG. 4) in operation 950.

When provision of the control interface for controlling the operations of the plurality of smart devices 330 is not needed on the basis of the determination result of operation 940, the IOT server (for example, the IOT server 310 of FIG. 3) may not provide the control interface for controlling the operations of the plurality of smart devices 330 in operation 960.

In another embodiment, operation 940 may be performed by the electronic device (for example, the electronic device 300 of FIG. 3 or the electronic device 400 of FIG. 4).

In another embodiment, when provision of the control interface for controlling the operations of the plurality of smart devices 330 is needed, the electronic device (for example, the electronic device 300 of FIG. 3 or the electronic device 400 of FIG. 4) may read the control interface stored in the internal memory of the electronic device (for example, the electronic device 300 of FIG. 3 or the electronic device 400 of FIG. 4) and control the operations of the plurality of smart devices 330.

At least some of the operations illustrated in FIG. 9 may be omitted. Before or after at least some of the operations illustrated in FIG. 9, at least some operations mentioned with reference to other drawings of the disclosure may be added and/or inserted. The operations illustrated in FIG. 9 may be performed by the processor (for example, the processor 120 of FIG. 1) of the electronic device (for example, the electronic device 101 of FIG. 1, the electronic device 300 of FIG. 3, or the electronic device 400 of FIG. 4) or the processor of the IOT server (for example, the IOT server 310 of FIG. 3). For example, the memory of the electronic device (for example, the electronic device 101 of FIG. 1, the electronic device 300 of FIG. 3, or the electronic device 400 of FIG. 4) or the IOT server (for example, the IOT server 310 of FIG. 3) may store instructions causing the processor to, when executed, perform at least some operations illustrated in FIG. 9.

Figure 10:
FIGS. 10 and 11 illustrate examples of a control interface provision method when a state of a device (for example, a smart device) registered in a user schedule (for example, home working) does not match a device at the current time point (for example, a smart device), according to some embodiments.
Figure 11:
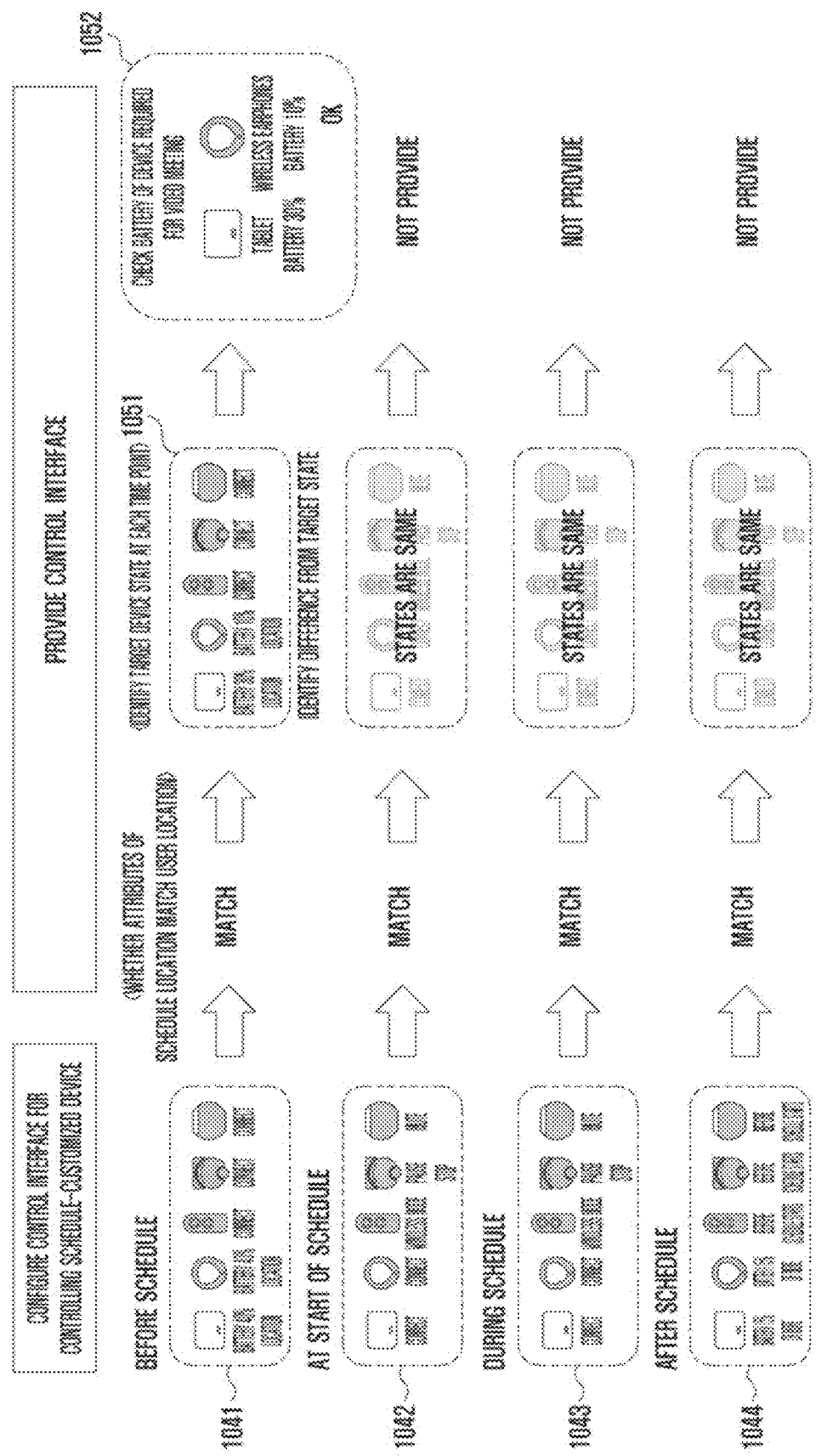

FIGS. 10 and 11 illustrate examples of a control interface provision method when a state of a device (for example, a smart device) registered in a user schedule (for example, home working) does not match a device at the current time point (for example, a smart device).

Referring to FIGS. 10 and 11, in an embodiment, when states of devices (for example, the plurality of smart devices 330 of FIG. 3) of the user schedule (for example, home working) do not match states of devices at the current time point (for example, the plurality of smart devices 330 of FIG. 3), a control interface 1030 may be provided to an electronic device 1000. The electronic device 1000 may control the operations of the plurality of smart devices 330 through the control interface 1030.

In an embodiment, the IOT server (for example, the IOT server 310 of FIG. 3) may provide the control interface 1030 to the electronic device 1000 (for example, the electronic device 300 of FIG. 3 or the electronic device 400 of FIG. 4).

In another embodiment, the control interface 1030 may be provided after the control interface 1030 stored in the internal memory of the electronic device 1000 (for example, the electronic device 300 of FIG. 3 or the electronic device 400 of FIG. 4) is read.

In an embodiment, the electronic device 1000 (for example, the electronic device 300 of FIG. 3 or the electronic device 400 of FIG. 4) or the IOT server 310 may configure devices (for example, the plurality of smart devices 330) related to a user schedule 1020 (for example, a video meeting) as indicated by reference numeral 1010.

In an embodiment, the electronic device 1000 (for example, the electronic device 300 of FIG. 3 or the electronic device 400 of FIG. 4) may receive the control interface 1030 for controlling the operations of the devices (for example, the plurality of smart devices 330) related to the user schedule 1020 (for example, the video meeting during home working) from the IOT server 310.

In another embodiment, the electronic device 1000 (for example, the electronic device 300 of FIG. 3 or the electronic device 400 of FIG. 4) may read the control interface 1030 for controlling the operations of the devices (for example, the plurality of smart devices 330) related to the user schedule 1020 (for example, the video meeting during home working) stored in the internal memory.

In an embodiment, the electronic device 1000 (for example, the electronic device 300 of FIG. 3 or the electronic device 400 of FIG. 4) may control the operations of the smart devices 330 through the control interface 1030 of the devices (for example, the plurality of smart devices 330) related to the user schedule 1020 (for example, the video meeting during home working).

For example, the electronic device 1000 (for example, the electronic device 300 of FIG. 3 or the electronic device 400 of FIG. 4) may separate the time point into before the schedule 1041, the start of the schedule 1042, during the schedule 1043, and after the schedule 1044 with respect to the user schedule 1020 (for example, the video meeting during home working).

In an embodiment, the electronic device 1000 (for example, the electronic device 300 of FIG. 3 or the electronic device 400 of FIG. 4) may identify states of the plurality of smart devices 330 according to each time point of the user schedule 1020 (for example, the video meeting during home working). In an embodiment, the electronic device 1000 (for example, the electronic device 300 of FIG. 3 or the electronic device 400 of FIG. 4) may identify the states of the plurality of smart devices 330 before the schedule 1041, at the start of the schedule 1042, during the schedule 1043, and after the schedule 1044 and the state of each of the plurality of smart devices 330 at the current time point.

In an embodiment, when the states of the smart device before the schedule 1041, at the start of the schedule 1042, during the schedule 1043, and after the schedule 1044 do not match the state of the smart device at the current time point as indicated by reference numeral 1051, the electronic device 1000 (for example, the electronic device 300 of FIG. 3 or the electronic device 400 of FIG. 4) or the IOT server (for example, the IOT server 310 of FIG. 3) may provide a control interface 1052 for controlling the operation of the smart device for the non-matching time point to the electronic device 1000. The control interface 1052 may be provided from the IOT server (for example, the IOT server 310 of FIG. 3) to the electronic device 1000, or the control interface 1052 stored in the internal memory of the electronic device 1000 may be read.

In an embodiment, the electronic device 1000 may control the operations of the plurality of smart devices 330 through the control interfaces 1030 and 1052.

At least some of the operations illustrated in FIGS. 10 and 11 may be omitted. Before or after at least some of the operations illustrated in FIGS. 10 and 11, at least some operations mentioned with reference to other drawings in the disclosure may be added and/or inserted. The operations illustrated in FIGS. 10 and 11 may be performed by the processor (for example, the processor 120 of FIG. 1) of the electronic device 1000 or the processor of the IOT server (for example, the IOT server 310 of FIG. 3). For example, the memory of the electronic device 1000 or the IOT server (for example, the IOT server 310 of FIG. 3) may store instructions causing the processor to, when executed, perform at least some operations illustrated in FIGS. 10 and 11.

Figure 12:
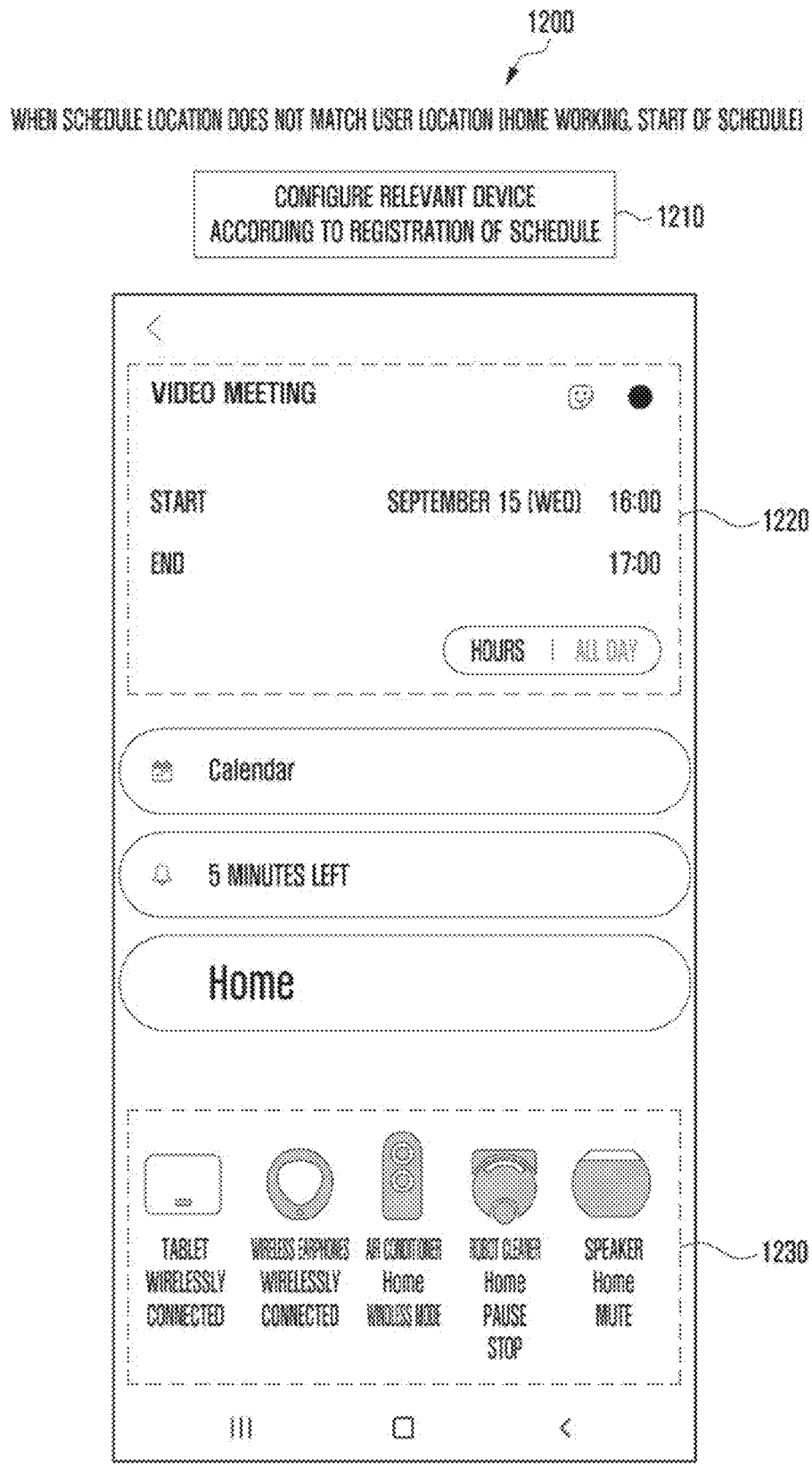
FIGS. 12 and 13 illustrate examples of a control interface provision method when a location registered in a user schedule (for example, home working) does not match a current user location, according to some embodiments.
Figure 13:
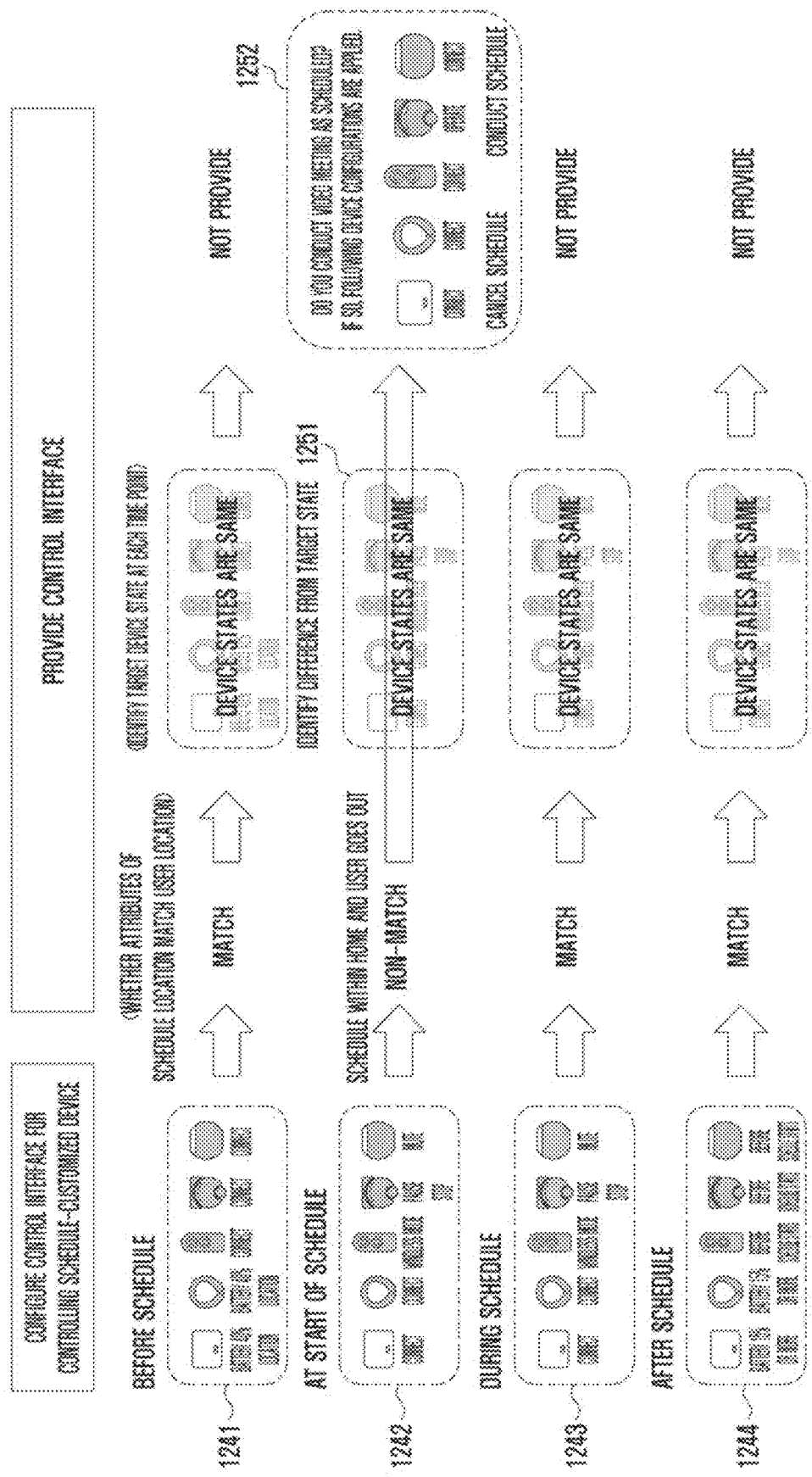

FIGS. 12 and 13 illustrate examples of a control interface provision method when a location registered in a user schedule (for example, home working) does not match a current user location.

Referring to FIGS. 12 and 13, as an embedment, when the location of the user schedule (for example, home working) does not match the user location, a control interface 1230 may be provided to the electronic device 1200. The electronic device 1200 may control operations of a plurality of smart devices (for example, the plurality of smart devices 330 of FIG. 3) through the control interface 1230.

In an embodiment, the IOT server (for example, the IOT server 310 of FIG. 3) may provide the control interface 1230 to the electronic device 1200 (for example, the electronic device 300 of FIG. 3 or the electronic device 400 of FIG. 4).

In another embodiment, the control interface 1230 may be provided after the control interface 1230 stored in the internal memory of the electronic device 1200 (for example, the electronic device 300 of FIG. 3 or the electronic device 400 of FIG. 4) is read.

In an embodiment, the electronic device 1200 (for example, the electronic device 300 of FIG. 3 or the electronic device 400 of FIG. 4) or the IOT server (for example, the IOT server 310 of FIG. 3) may configure devices (for example, the plurality of smart devices 330) related to a user schedule 1220 (for example, a video meeting) as indicated by reference numeral 1210.

In an embodiment, the electronic device 1200 (for example, the electronic device 300 of FIG. 3 or the electronic device 400 of FIG. 4) may receive the control interface 1230 for controlling the operations of the devices (for example, the plurality of smart devices 330) related to the user schedule 1220 (for example, the video meeting during home working) from the IOT server 310.

In another embodiment, the electronic device 1200 (for example, the electronic device 300 of FIG. 3 or the electronic device 400 of FIG. 4) may read the control interface 1230 for controlling the operations of the devices (for example, the plurality of smart devices 330) related to the user schedule 1220 (for example, the video meeting during home working) stored in the internal memory.

In an embodiment, the electronic device 1200 (for example, the electronic device 300 of FIG. 3 or the electronic device 400 of FIG. 4) may control the operations of the smart devices 330 through the control interface 1230 of the devices (for example, the plurality of smart devices 330) related to the user schedule 1220 (for example, the video meeting during home working).

For example, the electronic device 1200 (for example, the electronic device 300 of FIG. 3 or the electronic device 400 of FIG. 4) may separate the time point into before the schedule 1241, the start of the schedule 1242, during the schedule 1243, and after the schedule 1244 with respect to the user schedule 1220 (for example, the video meeting during home working).

In an embodiment, the electronic device 1200 (for example, the electronic device 300 of FIG. 3 or the electronic device 400 of FIG. 4) or the IOT server (for example, the IOT server 310 of FIG. 3) may identify the location of the user schedule according to each time point of the user schedule 1220 (for example, the video meeting during home working) and the user location at the current time point. For example, the electronic device 1200 (for example, the electronic device 300 of FIG. 3 or the electronic device 400 of FIG. 4) may identify the locations of the user schedule before the schedule 1241, at the start of the schedule 1242, during the schedule 1243, and after the schedule 1244 and the user location at the current time point.

In an embodiment, when the locations of the user schedule before the schedule 1241, at the start of the schedule 1242, during the schedule 1243, and after the schedule 1244 do not match the user location at the current time point as indicated by reference numeral 1251, the electronic device 1200 (for example, the electronic device 300 of FIG. 3 or the electronic device 400 of FIG. 4) or the IOT server (for example, the IOT server 310 of FIG. 3) may provide a control interface 1252 for controlling the operation of the smart device for the time point at which the user location does not match. The control interface 1252 may be provided from the IOT server (for example, the IOT server 310 of FIG. 3) to the electronic device 1200, or the control interface 1252 stored in the internal memory of the electronic device 1200 may be read.

In an embodiment, the electronic device 1200 may control operations of the plurality of smart devices 330 through the control interfaces 1230 and 1252.

At least some of the operations illustrated in FIGS. 12 and 13 may be omitted. Before or after at least some of the operations illustrated in FIGS. 12 and 13, at least some operations mentioned with reference to other drawings in the disclosure may be added and/or inserted. The operations illustrated in FIGS. 12 and 13 may be performed the processor (for example, the processor 120 of FIG. 1) of the electronic device 1200 or the processor of the IOT server (for example, the IOT server 310 of FIG. 3). For example, the memory of the electronic device 1200 or the IOT server (for example, the IOT server 310 of FIG. 3) may store instructions causing the processor to, when executed, perform at least some operations illustrated in FIGS. 12 and 13.

Figure 14:
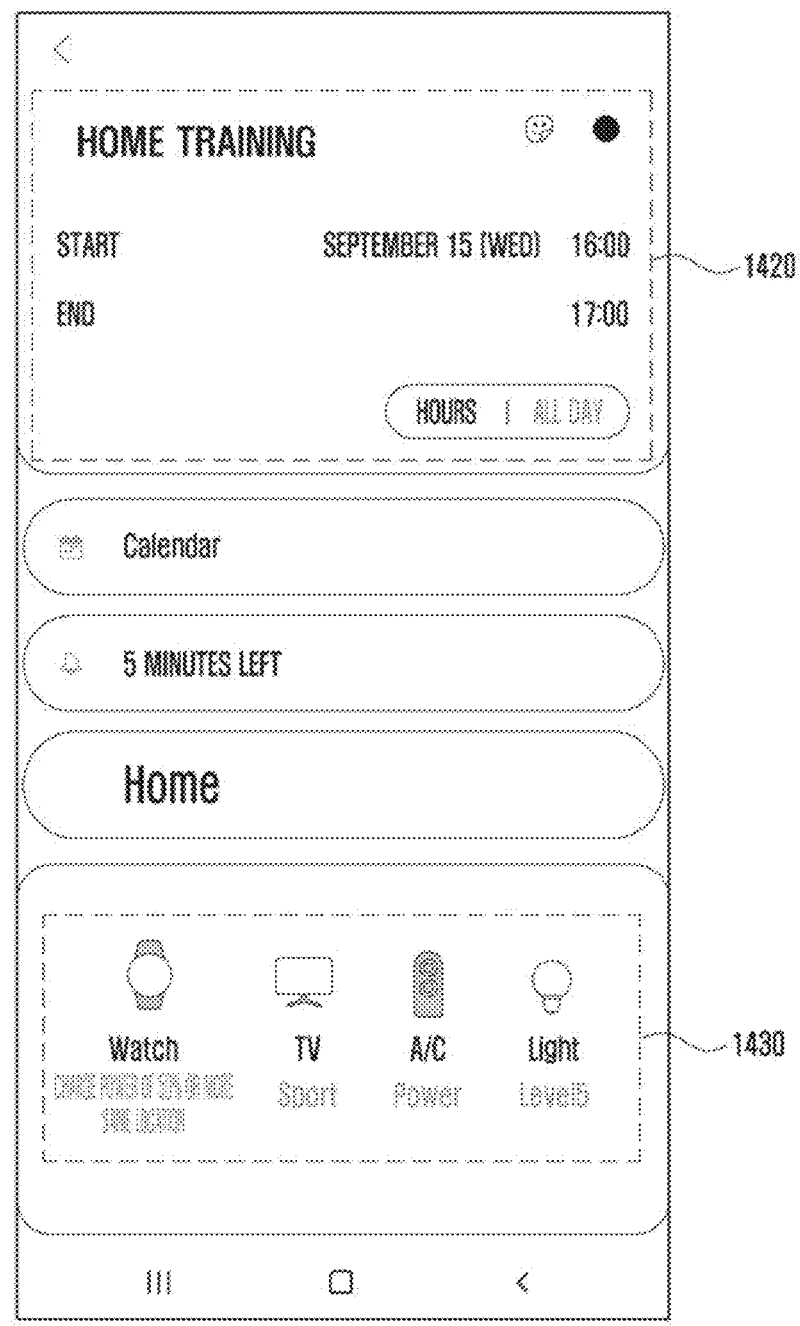
FIGS. 14 and 15 illustrate examples of a control interface provision method when a state of a device (for example, a smart device) registered in a user schedule (for example, home training) does not match a state of a device at the current time point (for example, a smart device), according to some embodiments.
Figure 15:
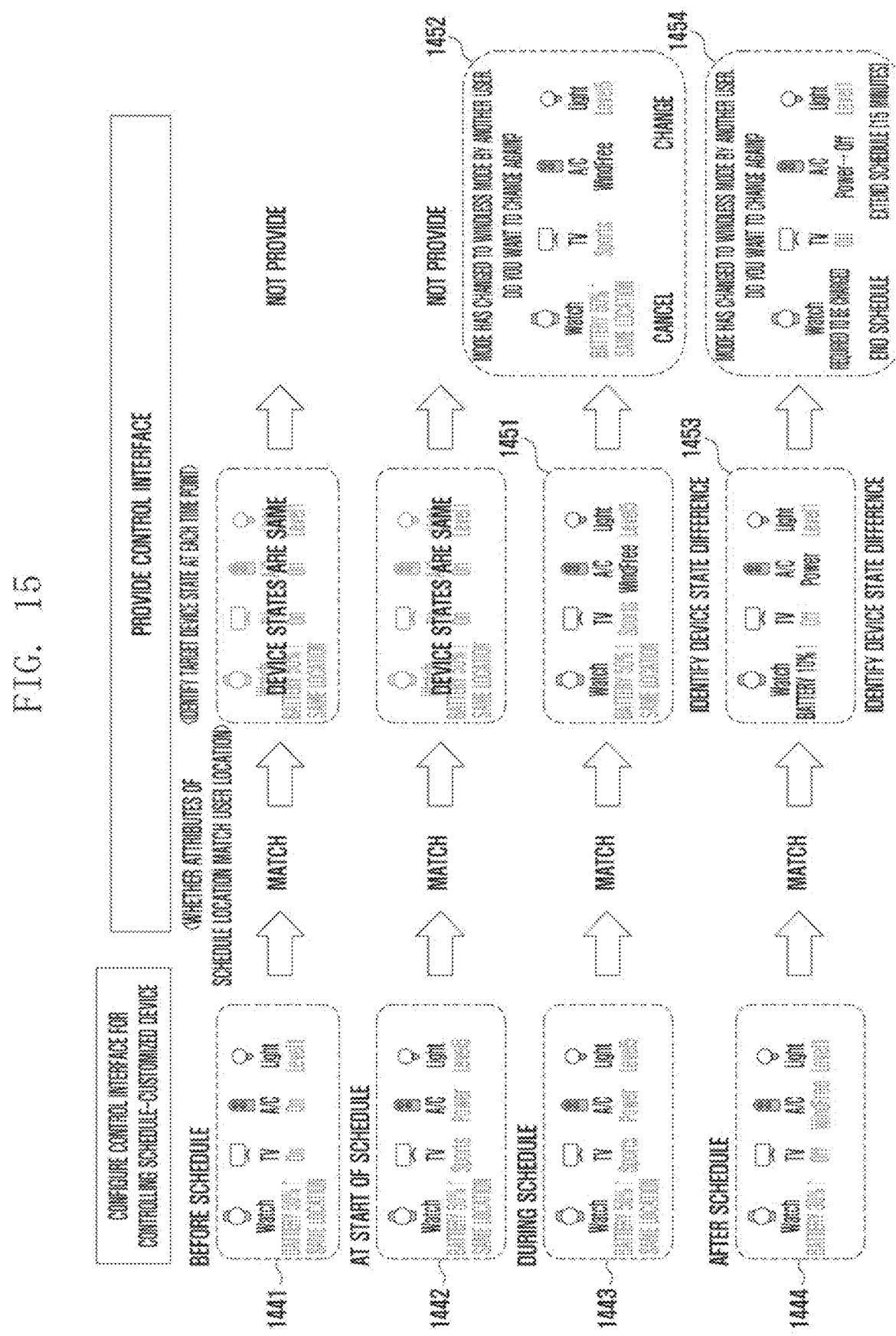

FIGS. 14 and 15 illustrate examples of a control interface provision method when a state of a device (for example, a smart device) registered in a user schedule (for example, home training) does not match a state of a device at the current time point (for example, a smart device).

Referring to FIGS. 14 and 15, in an embodiment, when states of the devices (for example, the plurality of smart devices 330 of FIG. 3) of the user schedule (for example, home training) do not match the states of the devices (for example, the plurality of smart devices 330 of FIG. 3) at the current time point, a control interface 1430 may be provided to an electronic device 1400. The electronic device 1400 may control the operations of the plurality of smart devices 330 through the control interface 1430.

In an embodiment, the IOT server (for example, the IOT server 310 of FIG. 3) may provide the control interface 1430 to the electronic device 1400 (for example, the electronic device 300 of FIG. 3 or the electronic device 400 of FIG. 4).

In another embodiment, the control interface 1430 may be provided after the control interface 1430 stored in the internal memory of the electronic device 1400 (for example, the electronic device 300 of FIG. 3 or the electronic device 400 of FIG. 4) is read.

In an embodiment, the electronic device 1400 (for example, the electronic device 300 of FIG. 3 or the electronic device 400 of FIG. 4) or the IOT server 310 may configure devices (for example, the plurality of smart devices 330) related to the user schedule 1420 (for example, home training) as indicated by reference numeral 1410.

In an embodiment, the electronic device 1400 (for example, the electronic device 300 of FIG. 3 or the electronic device 400 of FIG. 4) or the IOT server 310 may receive the control interface 1430 for controlling operations of the devices (for example, the plurality of smart devices 330) related to the user schedule 1420 (for example, home training) from the IOT server 310.

In another embodiment, the electronic device 1200 (for example, the electronic device 300 of FIG. 3 or the electronic device 400 of FIG. 4) may read the control interface 1430 for controlling operations of the devices (for example, the plurality of smart devices 330) related to the user schedule 1420 (for example, home training) stored in the internal memory.

In an embodiment, the electronic device 1400 (for example, the electronic device 300 of FIG. 3 or the electronic device 400 of FIG. 4) or the IOT server 310 may control the operations the plurality of smart devices 330 through the control interface 1430 of the devices (for example, the plurality of smart devices 330) related to the user schedule 1420 (for example, home training).

For example, the electronic device 1400 (for example, the electronic device 300 of FIG. 3 or the electronic device 400 of FIG. 4) or the IOT server 310 may separate the time point into before the schedule 1441, the start of the schedule 1442, during the schedule 1443, and after the schedule 1444 with respect to the user schedule 1420 (for example, home training).

In an embodiment, the electronic device 1400 (for example, the electronic device 300 of FIG. 3 or the electronic device 400 of FIG. 4) may identify states of the plurality of smart devices 330 according to each time point of the user schedule 1420 (for example, hone training). In an embodiment, the electronic device 1400 (for example, the electronic device 300 of FIG. 3 or the electronic device 400 of FIG. 4) may identify the states of the plurality of smart devices 330 before the schedule 1441, at the start of the schedule 1442, during the schedule 1443, and after the schedule 1444 and the state of each of the plurality of smart devices 330 at the current time point.

In an embodiment, when the states of the smart device before the schedule 1441, at the start of the schedule 1442, during the schedule 1443, and after the schedule 1444 do not match the state of the smart device at the current state, the electronic device 1400 (for example, the electronic device 300 of FIG. 3 or the electronic device 400 of FIG. 4) or the IOT server (for example, the IOT server 310 of FIG. 3) may provide the control interface 1452 or 1454 for controlling the operation of the smart device for the non-matching time point 1451 or 1453 to the electronic device 1000. The control interface 1452 or 1454 may be provided from the IOT server (for example, the IOT server 310 of FIG. 3) to the electronic device 1400, or the control interface 1452 or 1454 stored in the internal memory of the electronic device 1400 may be read.

In an embodiment, the electronic device 1400 may control the operations of the plurality of smart devices 330 through the control interface 1430, 1452, or 1454.

At least some of the operations illustrated in FIGS. 14 and 15 may be omitted. Before or after at least some of the operations illustrated in FIGS. 14 and 15, at least some operations mentioned with reference to other drawings in the disclosure may be added and/or inserted. The operations illustrated in FIGS. 14 and 15 may be performed the processor (for example, the processor 120 of FIG. 1) of the electronic device 1400 or the processor of the IOT server (for example, the IOT server 310 of FIG. 3). For example, the memory of the electronic device 1400 or the IOT server (for example, the IOT server 310 of FIG. 3) may store instructions causing the processor to, when executed, perform at least some operations illustrated in FIGS. 14 and 15.

Figure 16:
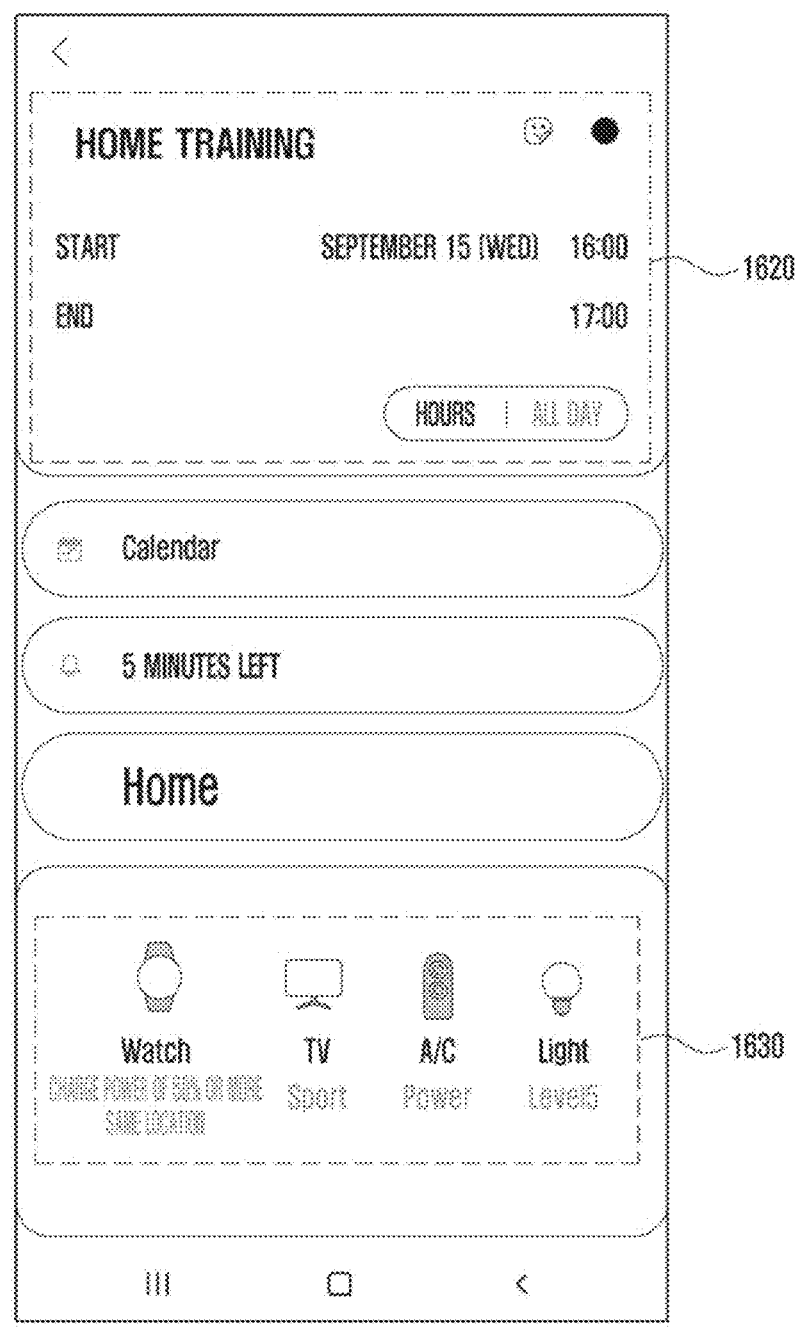
FIGS. 16 and 17 illustrate examples of a control interface provision method when the location registered in the user schedule (for example, home training) does not match the current user location, according to some embodiments.
Figure 17:
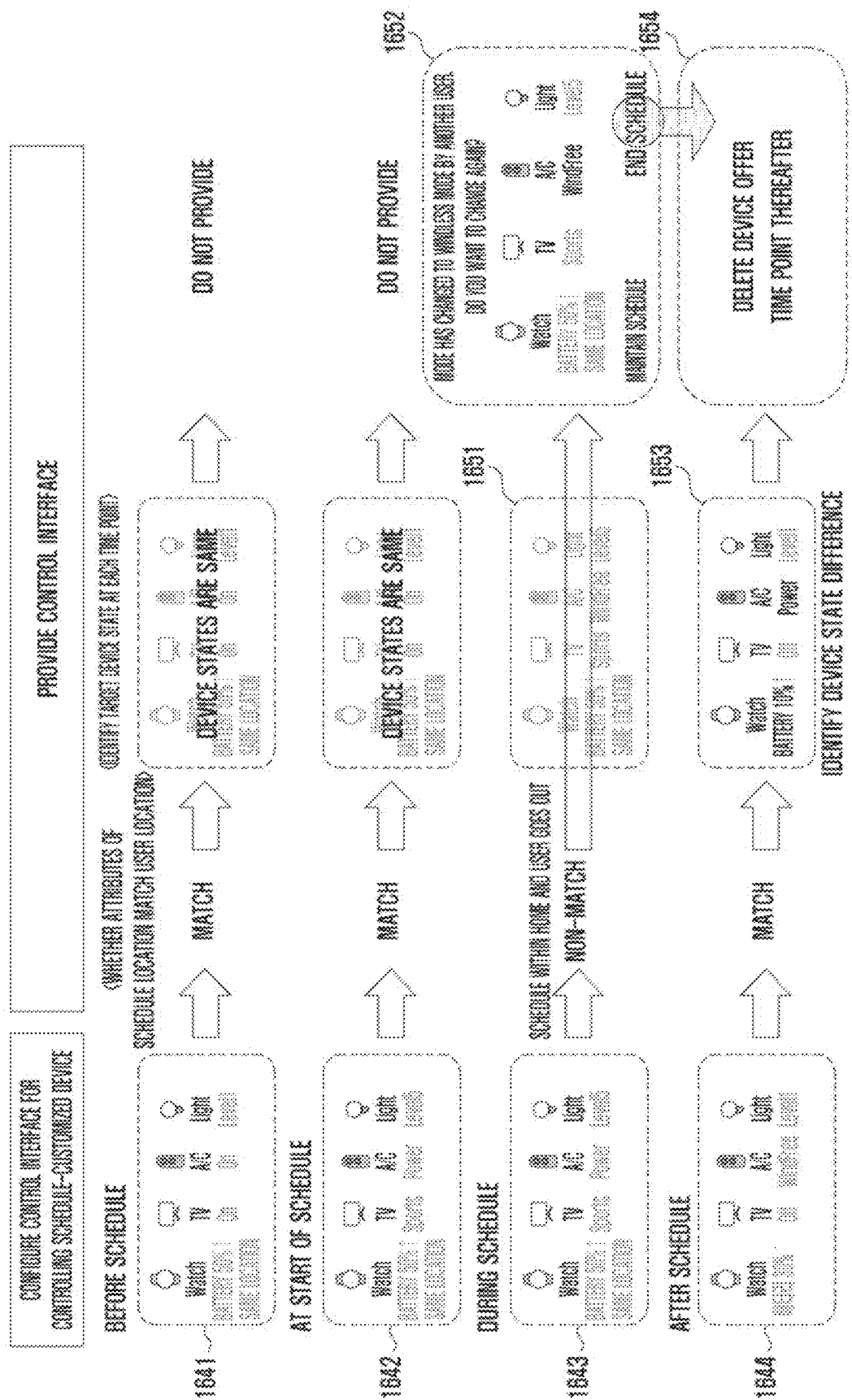

FIGS. 16 and 17 illustrate examples of a control interface provision method when the location registered in the user schedule (for example, home training) does not match the current user location.

Referring to FIGS. 16 and 17, in an embodiment, when the location of the user schedule (for example, home training) does not match the user location, a control interface 1630 may be provided to an electronic device 1600. The electronic device 1600 may control operations of a plurality of smart devices (for example, the plurality of smart devices 330 of FIG. 3) through the control interface 1630.

In an embodiment, the IOT server (for example, the IOT server 310 of FIG. 3) may provide the control interface 1630 to the electronic device 1600 (for example, the electronic device 300 of FIG. 3 or the electronic device 400 of FIG. 4).

In another embodiment, the control interface 1630 may be provided after the control interface 1630 stored in the internal memory of the electronic device 1600 (for example, the electronic device 300 of FIG. 3 or the electronic device 400 of FIG. 4) is read.

In an embodiment, the electronic device 1600 (for example, the electronic device 300 of FIG. 3 or the electronic device 400 of FIG. 4) or the IOT server (for example, the IOT server 310 of FIG. 3) may configure devices (for example, the plurality of smart devices 330) related to a user schedule 1620 (for example, home training) as indicated by reference numeral 1610.

In an embodiment, the electronic device 1600 (for example, the electronic device 300 of FIG. 3 or the electronic device 400 of FIG. 4) may receive the control interface 1630 for controlling operations of the devices for example, the plurality of smart devices 330) related to the user schedule 1620 (for example, home training) from the IOT server 310.

In another embodiment, the electronic device 1600 (for example, the electronic device 300 of FIG. 3 or the electronic device 400 of FIG. 4) may read the control interface 1630 for controlling operations of the devices (for example, the plurality of smart devices 330) related to the user schedule 1620 (for example, home training) stored in the internal memory.

In an embodiment, the electronic device 1400 (for example, the electronic device 300 of FIG. 3 or the electronic device 400 of FIG. 4) may control the operations of the plurality of smart devices 330 through the control interface 1630 of the devices (for example, the plurality of smart devices 330) related to the user schedule 1620 (for example, home training).

For example, the electronic device 1600 (for example, the electronic device 300 of FIG. 3 or the electronic device 400 of FIG. 4) may separate the time point into before the schedule 1641, the start of the schedule 1642, during the schedule 1643, and after the schedule 1644 with respect to the user schedule 1620 (for example, home training).

In an embodiment, the electronic device 1600 (for example, the electronic device 300 of FIG. 3 or the electronic device 400 of FIG. 4) or the IOT server 310 may identify the location of the user schedule according to each time point of the user schedule 1620 (for example, home training) and the user location at the current time point. For example, the electronic device 1600 (for example, the electronic device 300 of FIG. 3 or the electronic device 400 of FIG. 4) may identify the location of the user schedule before the schedule 1641, at the start of the schedule 1642, during the schedule 1643, and after the schedule 1644 and the user location at the current time point.

In an embodiment, when the location of the user schedule before the schedule 1641, at the start of the schedule 1642, during the schedule 1643, and after the schedule 1644 does not match the user location at the current time point as indicated by reference numeral 1651 or 1653, the electronic device 1600 (for example, the electronic device 300 of FIG. 3 or the electronic device 400 of FIG. 4) or the IOT server (for example, the IOT server 310 of FIG. 3) may provide the control interface 1652 or 1654 for controlling the operation of the smart device for the time point at which the user location does not match to the electronic device 1600. The control interface 1652 or 1654 may be provided from the IOT server (for example, the IOT server 310 of FIG. 3) to the electronic device 1600, or the control interface 1652 or 1654 stored in the internal memory of the electronic device 1600 may be read.

In an embodiment, the electronic device 1600 may control the operations of the plurality of smart devices 330 through the control interface 1630, 1652, or 1654.

At least some of the operations illustrated in FIGS. 16 and 17 may be omitted. Before or after at least some of the operations illustrated in FIGS. 16 and 17, at least some operations mentioned with reference to other drawings in the disclosure may be added and/or inserted. The operations illustrated in FIGS. 16 and 17 may be performed the processor (for example, the processor 120 of FIG. 1) of the electronic device 1600 or the processor of the IOT server (for example, the IOT server 310 of FIG. 3). For example, the memory of the electronic device 1600 or the IOT server (for example, the IOT server 310 of FIG. 3) may store instructions causing the processor to, when executed, perform at least some operations illustrated in FIGS. 16 and 17.

Figure 18:
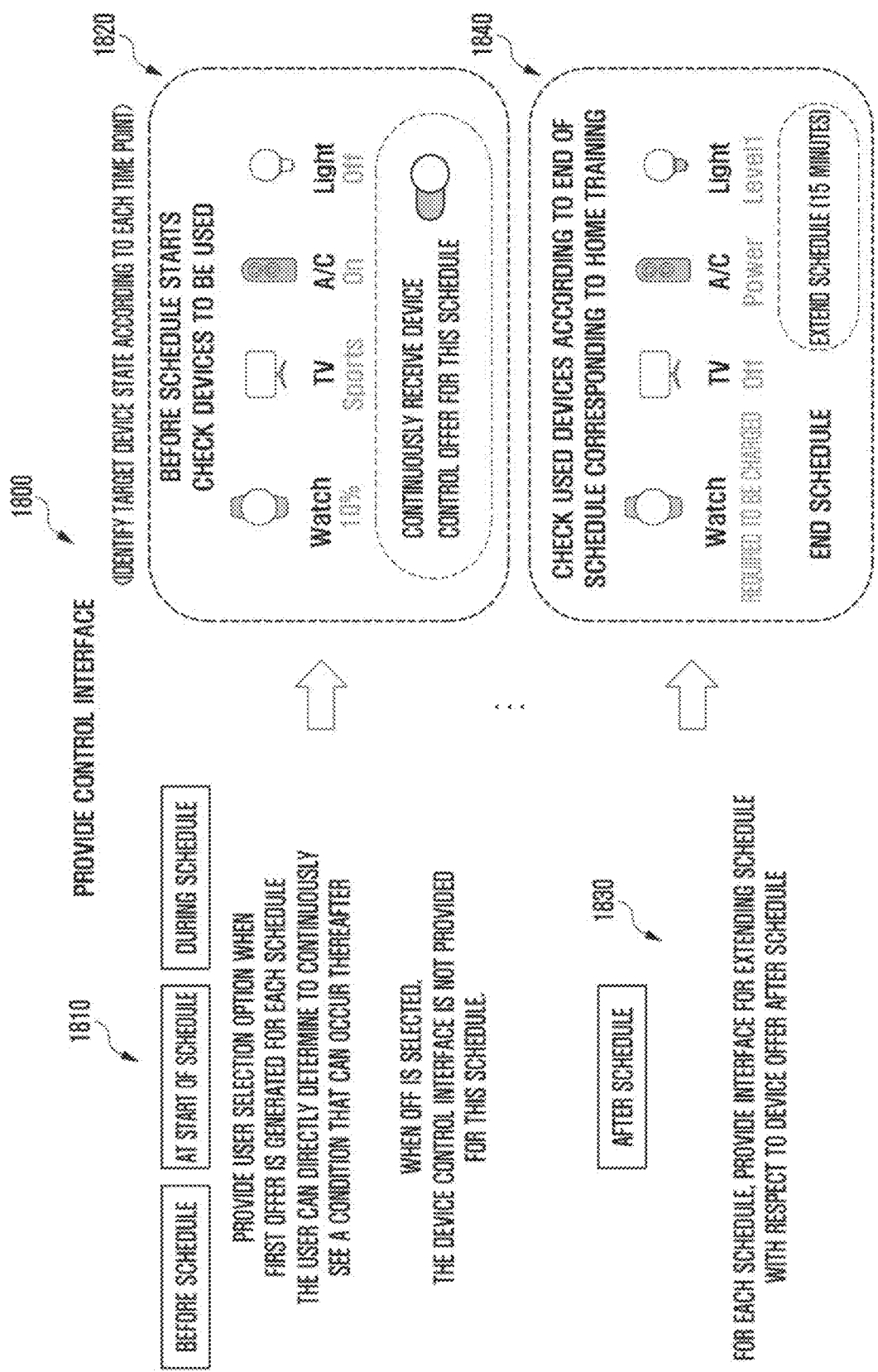
FIG. 18 illustrates an example of a user configuration option for a control interface for controlling operations of smart devices, according to some embodiments.

FIG. 18 illustrates an example of a user configuration option for a control interface for controlling operations of smart devices.

Referring to FIG. 18, an electronic device 1800 (for example, the electronic device 300 of FIG. 3, the electronic device 400 of FIG. 4, the electronic device 1000 of FIG. 10, the electronic device 1200 of FIG. 12, the electronic device 1400 of FIG. 14, or the electronic device 1600 of FIG. 16) or an IOT server (for example, the IOT server 310 of FIG. 3) according to various embodiments may configure a user option for a control interface of devices (for example, the plurality of smart devices 330 of FIG. 3) according to each user schedule time point.

In an embodiment, the electronic device 1800 or the IOT server 310 may separate the time point into before the user schedule, the start of the user schedule, during the user schedule 1810, and after the user schedule 1830 and provide the user option for the control interface.

In an embodiment, the electronic device 1800 or the IOT server 310 may provide a user option 1820 of the control interface for controlling operations of a plurality of smart devices (for example, the plurality of smart devices 330 of FIG. 3) before the user schedule, at the start of the user schedule, or during the user schedule 1810. For example, when a first offer is made before the start of the user schedule, at the time point at which the user schedule starts, and during the user schedule 1810, the electronic device 1800 or the IOT server 310 may provide the user option 1820 of the control interface. For example, when a configuration of 'continuously receiving an offer to control the device with respect to this schedule' is turned off in the user option 1820 of the control interface, the electronic device 1800 or the IOT server 310 may not provide the control interface for this schedule thereafter.

In an embodiment, the electronic device 1800 or the IOT server 310 may provide the user option 1840 of the control interface for controlling operations of the smart devices (for example, the plurality of smart devices 330 of FIG. 3) after the user schedule 1830. For example, the electronic device 1800 or the IOT server 310 may provide the user option 1840 of the control interface to extend the operations of the plurality of smart devices 330 by extending the user schedule after the schedule 1830.

FIG. 19 is a diagram 1900 illustrating an example of a user configuration option for a control interface for each device (for example, smart device) according to a user schedule (for example, home working).

Referring to FIG. 19, an electronic device (for example, the electronic device 300 of FIG. 3, the electronic device 400 of FIG. 4, the electronic device 1000 of FIG. 10, the electronic device 1200 of FIG. 12, the electronic device 1400 of FIG. 14, the electronic device 1600 of FIG. 16, or the electronic device 1800 of FIG. 18) or an IOT server (for example, the IOT server 310 of FIG. 3) according to various embodiments may provide a user configuration option for a control interface for each of a plurality of smart devices (for example, the plurality of smart devices 330 of FIG. 3) according to a user schedule (for example, home working).

In an embodiment, the smart devices 330 may include mobile devices, tablet devices, smart watches, Bluetooth earphones (for example, buds), speakers, washing machines, drying machines, steam closets, shoes cleaners, robot cleaners, ovens, air conditions, air purifiers, TVs, sound bars (audio), and lights.

In an embodiment, the electronic device or the IOT server 310 according to various embodiments may classify the plurality of smart devices 330 according to a device characteristic and configure operation options of the plurality of smart devices 330.

For example, the electronic device or the IOT server 310 according to various embodiments may classify the plurality of smart devices 330 into devices which can move and devices which cannot move on the basis of mobility. The electronic device or the IOT server 310 according to various embodiments may configure an operation option according to the device which can move and the device which cannot move.

For example, the electronic device or the IOT server 310 according to various embodiments may classify the plurality of smart devices 330 into devices which are required to be charged and devices which are not required to be charged on the basis of whether the devices are required to be charged. The electronic device or the IOT server 310 according to various embodiments may configure an operation option according to the device which is required to be charged and the device which is not required to be charted.

For example, the electronic device or the IOT server 310 according to various embodiments may classify the plurality of smart devices 330 into public devices and non-public devices on the basis of whether the devices are public devices. The electronic device or the IOT server 310 according to various embodiments may configure an operation option according to the public device and the non-public device.

FIG. 20 is a diagram 2000 illustrating an example of a user configuration option for a control interface at each time point of a user schedule according to the user schedule.

Referring to FIG. 20, an electronic device (for example, the electronic device 300 of FIG. 3, the electronic device 400 of FIG. 4, the electronic device 1000 of FIG. 10, the electronic device 1200 of FIG. 12, the electronic device 1400 of FIG. 14, the electronic device 1600 of FIG. 16, or the electronic device 1800 of FIG. 18) or an IOT server (for example, the IOT server 310 of FIG. 3) according to various embodiments provide a user configuration option of a control interface for each of a plurality of smart devices (for example, the plurality of smart devices 330 of FIG. 3) according to a time point (for example, before the schedule, at the start of the schedule, during the schedule, or after the schedule) of the user schedule (for example, home working).

In an embodiment, the smart devices 330 may include mobile devices, tablet devices, smart watches, Bluetooth earphones (for example, buds), speakers, washing machines, drying machines, steam closets, shoes cleaners, robot cleaners, ovens, air conditions, air purifiers, TVs, sound bars (audio), and/or lights, etc.

In an embodiment, the electronic device or the IOT server 310 according to various embodiments may classify the plurality of smart devices 330 according to the time point (for example, before the schedule, at the start of the schedule, during the schedule, or after the schedule) of the user schedule (for example, home working) and configure operation options of the plurality of smart devices 330.

For example, the electronic device or the IOT server 310 according to various embodiments may classify the plurality of smart devices 330 according to the time point before the user schedule (for example, home working) and configure operation options of the plurality of smart devices 330 (for example, power on, power off, communication connection, communication disconnection, and operation mode).

For example, the electronic device or the IOT server 310 according to various embodiments may classify the plurality of smart devices 330 according to the start of the user schedule (for example, home working) and configure operation options of the plurality of smart devices 330 (for example, power on, power off, communication connection, communication disconnection, and operation mode).

For example, the electronic device or the IOT server 310 according to various embodiments may classify the plurality of smart devices 330 according to the time point during the user schedule (for example, home working) and configure operation options of the plurality of smart devices 330 (for example, power on, power off, communication connection, communication disconnection, and operation mode).

For example, the electronic device or the IOT server 310 according to various embodiments may classify the plurality of smart devices 330 according to the time point after the user schedule (for example, home working) and configure operation options of the plurality of smart devices 330 (for example, power on, power off, communication connection, communication disconnection, and operation mode).

Figure 21:
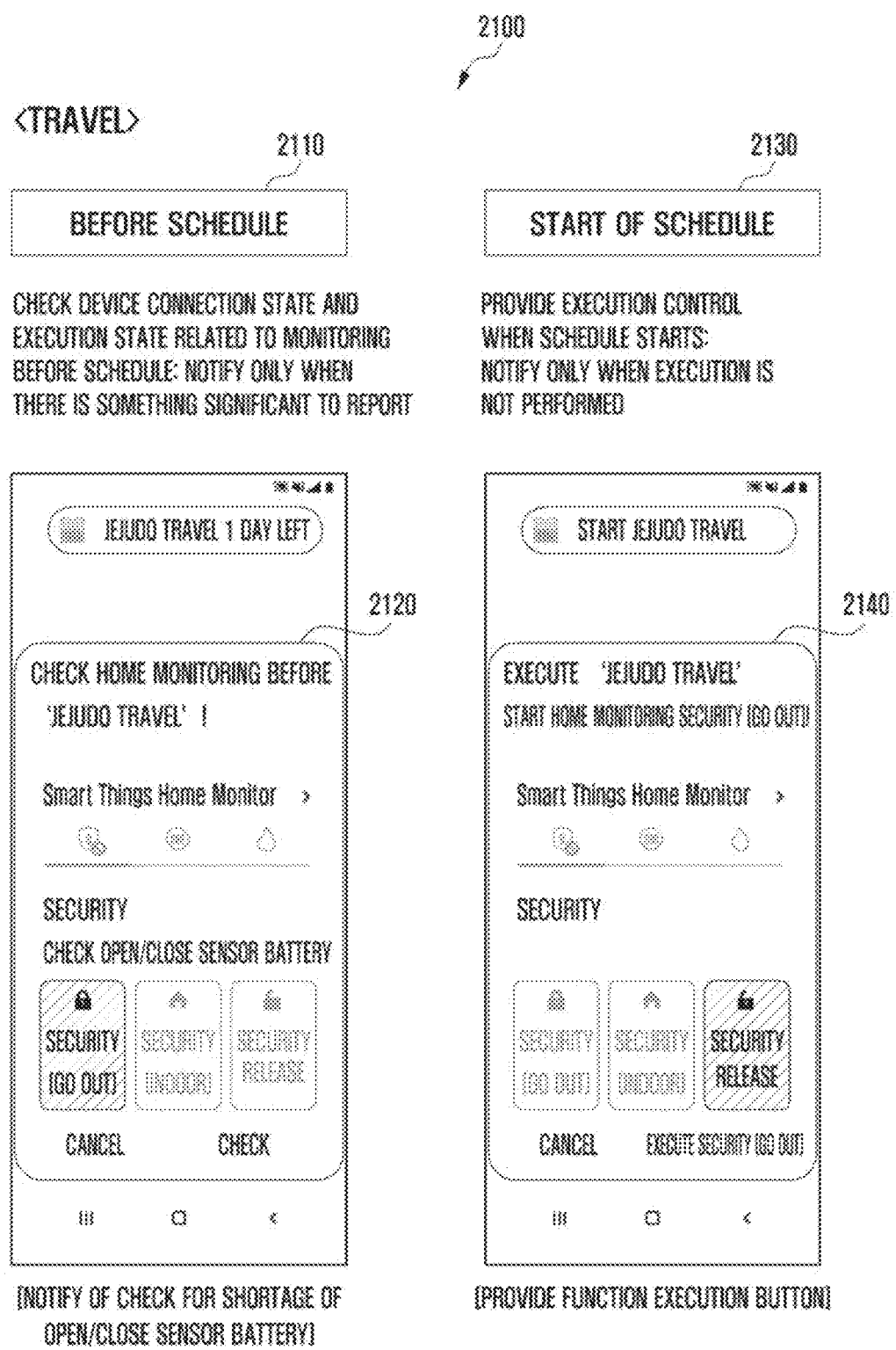
FIGS. 21 and 22 illustrate examples of a control interface provision method according to a user schedule (for example, travel), according to some embodiments.
Figure 22:
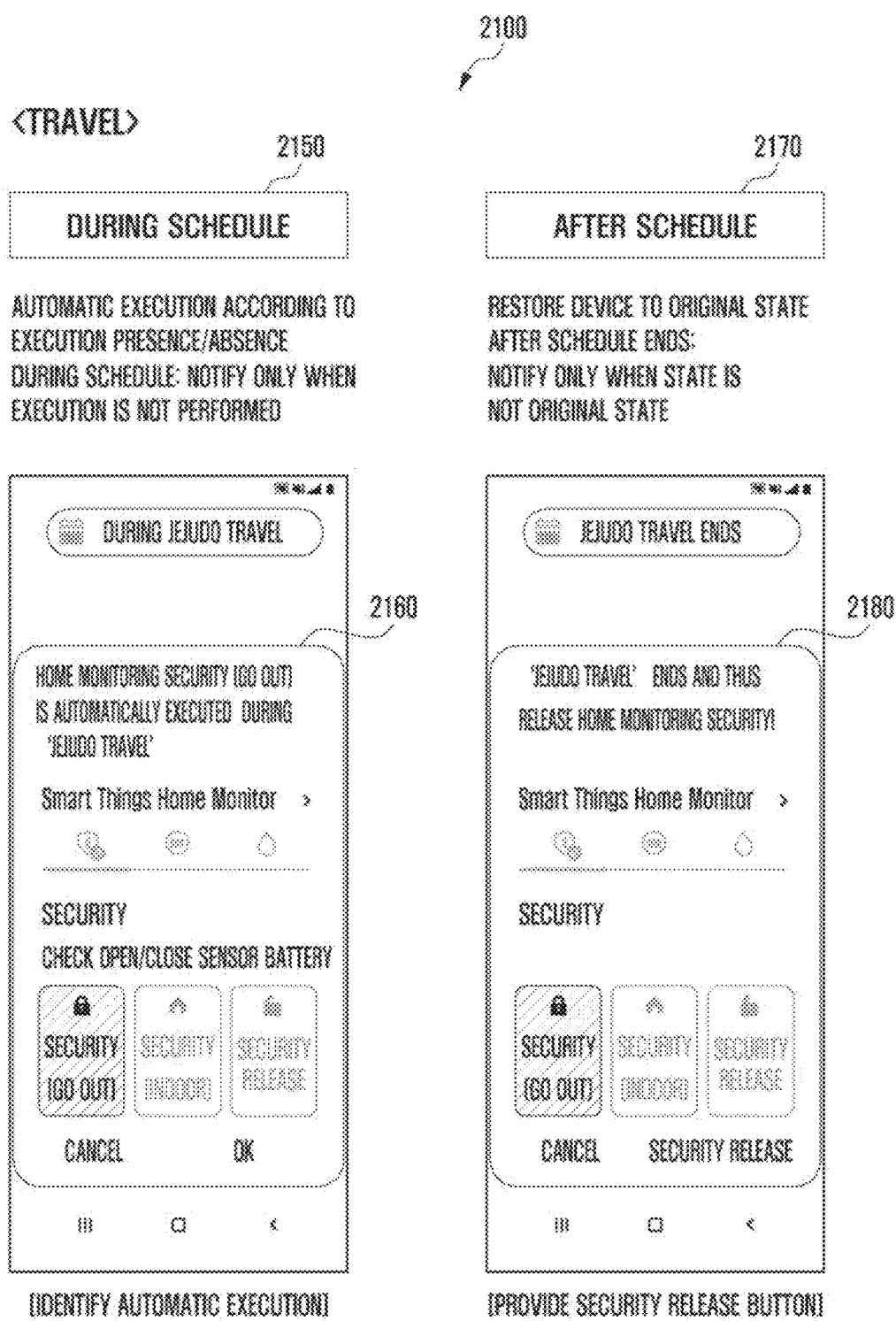

FIGS. 21 and 22 illustrate examples of a control interface provision method according to a user schedule (for example, travel).

Referring to FIGS. 21 and 22, an electronic device 2100 (for example, the electronic device 300 of FIG. 3, the electronic device 400 of FIG. 4, the electronic device 1000 of FIG. 10, the electronic device 1200 of FIG. 12, the electronic device 1400 of FIG. 14, the electronic device 1600 of FIG. 16, or the electronic device 1800 of FIG. 18) or an IOT server (for example, the IOT server 310 of FIG. 3) according to various embodiments may provide a control interface for each of a plurality of smart devices (for example, the plurality of smart devices 330 of FIG. 3) according to a time point (for example, before the schedule 2110, at the start of the schedule 2130, during the schedule 2150, or after the schedule 2170) of the user schedule (for example, travel).

In an embodiment, the time points of the user schedule (for example, travel) may include time points before the schedule 2110, at the schedule starts 2130, during the schedule 2150, and after the schedule 2170.

For example, the electronic device 2100 or the IOT server 310 according to various embodiments may provide a first control interface 2120 for controlling operations of the plurality of smart devices 330 according to the time point before the schedule 2110 of the user schedule (for example, travel).

For example, the electronic device 2100 or the IOT server 310 according to various embodiments may provide a second control interface 2140 (for example, informing of home monitoring security (go out) execution before the start of the travel) for controlling the operations of the plurality of smart devices 330 according to the start of the schedule 2130 of the user schedule (for example, travel).

For example, the electronic device 2100 or the IOT server 310 according to various embodiments may provide a third control interface 2160 for controlling the operations of the plurality of smart devices 330 according to the time point during the schedule 2150 of the user schedule (for example, travel).

For example, the electronic device 2100 or the IOT server 310 according to various embodiments may provide a fourth control interface 2180 for controlling the operations of the plurality of smart devices 330 according to the time point after the schedule 2170 of the user schedule (for example, travel).

FIG. 23 is a diagram 2300 illustrating an example of a user configuration option of a control interface for each device (for example, smart device) according to a user schedule (for example, travel).

Referring to FIG. 23, an electronic device 2100 (for example, the electronic device 300 of FIG. 3, the electronic device 400 of FIG. 4, the electronic device 1000 of FIG. 10, the electronic device 1200 of FIG. 12, the electronic device 1400 of FIG. 14, the electronic device 1600 of FIG. 16, the electronic device 1800 of FIG. 18, or the electronic device 2100 of FIG. 21) or an IOT server (for example, the IOT server 310 of FIG. 3) according to various embodiments may provide a user configuration option of a control interface for each of a plurality of smart devices (for example, the plurality of smart devices 330 of FIG. 3) according to a user schedule (for example, travel).

In an embodiment, the smart devices 330 may include mobile devices, air conditioners, air purifiers, home CCTVs, open/close sensors, human body sensors, smoke detectors, and leakage detection sensors.

In an embodiment, the electronic device or the IOT server 310 according to various embodiments may classify the plurality of smart devices 330 according to a device characteristic and configure operation options of the plurality of smart devices 330.

For example, the electronic device or the IOT server 310 according to various embodiments may classify the plurality of smart devices 330 into public devices and non-public devices on the basis of whether the devices are public devices. The electronic device or the IOT server 310 according to various embodiments may configure an operation option according to the public device and the non-public device.

For example, the electronic device or the IOT server 310 according to various embodiments may classify the plurality of smart devices 330 into device which can move and devices which cannot move on the basis of mobility. The electronic device or the IOT server 310 according to various embodiments may configure an operation option according to the device which can move and the device which cannot move.

For example, the electronic device or the IOT server 310 according to various embodiments may classify the plurality of smart devices 330 into devices which are required to be charged and devices which are not required to be charged on the basis of whether the devices are required to be charged. The electronic device or the IOT server 310 according to various embodiments may configure an operation option according to the device which is required to be charged and the device which is not required to be charted.

FIG. 24 is a diagram 2400 illustrating an example of a user configuration option of a control interface for each time point of a user schedule according to the user schedule (for example, travel).

Referring to FIG. 24, an electronic device (for example, the electronic device 300 of FIG. 3, the electronic device 400 of FIG. 4, the electronic device 1000 of FIG. 10, the electronic device 1200 of FIG. 12, the electronic device 1400 of FIG. 14, the electronic device 1600 of FIG. 16, the electronic device 1800 of FIG. 18, or the electronic device 2100 of FIG. 21) or an IOT server (for example, the IOT server 310 of FIG. 3) according to various embodiments may provide a user configuration option of a control interface for each of a plurality of smart devices (for example, the plurality of smart devices 330 of FIG. 3) according to a time point (for example, before the schedule, at the start of the schedule, during the schedule, or after the schedule) of a user schedule (for example, travel).

In an embodiment, the smart devices 330 may include mobile devices, air conditioners, air purifiers, home CCTVs, open/close sensors, human body sensors, smoke detectors, and leakage detection sensors.

In an embodiment, the electronic device or the IOT server 310 according to various embodiments may classify the plurality of smart devices 330 according to the time point (before the schedule, at which the schedule starts, during the schedule, or after the schedule) of the user schedule (for example, travel) and configure operation options of the plurality of smart devices 330.

For example, the electronic device or the IOT server 310 according to various embodiments may classify the plurality of smart devices 330 according to the time point before the schedule of the user schedule (for example, travel) and configure operation options of the plurality of smart devices 330 (for example, power on, power off, communication connection, communication disconnection, security start, security release, reservation, reservation cancel, and operation mode).

For example, the electronic device or the IOT server 310 according to various embodiments may classify the plurality of smart devices 330 according to the start of the schedule of the user schedule (for example, travel) and configure operation options of the plurality of smart devices 330 (for example, power on, power off, communication connection, communication disconnection, security start, security release, reservation, reservation cancel, and operation mode).

For example, the electronic device or the IOT server 310 according to various embodiments may classify the plurality of smart devices 330 according to the time point during the schedule of the user schedule (for example, travel) and configure operation options of the plurality of smart devices 330 (for example, power on, power off, communication connection, communication disconnection, security start, security release, reservation, reservation cancel, and operation mode).

For example, the electronic device or the IOT server 310 according to various embodiments may classify the plurality of smart devices 330 according to the time point after the schedule of the schedule of the user schedule (for example, travel) and configure operation options of the plurality of smart devices 330 (for example, power on, power off, communication connection, communication disconnection, security start, security release, reservation, reservation cancel, and operation mode).

Figure 25:
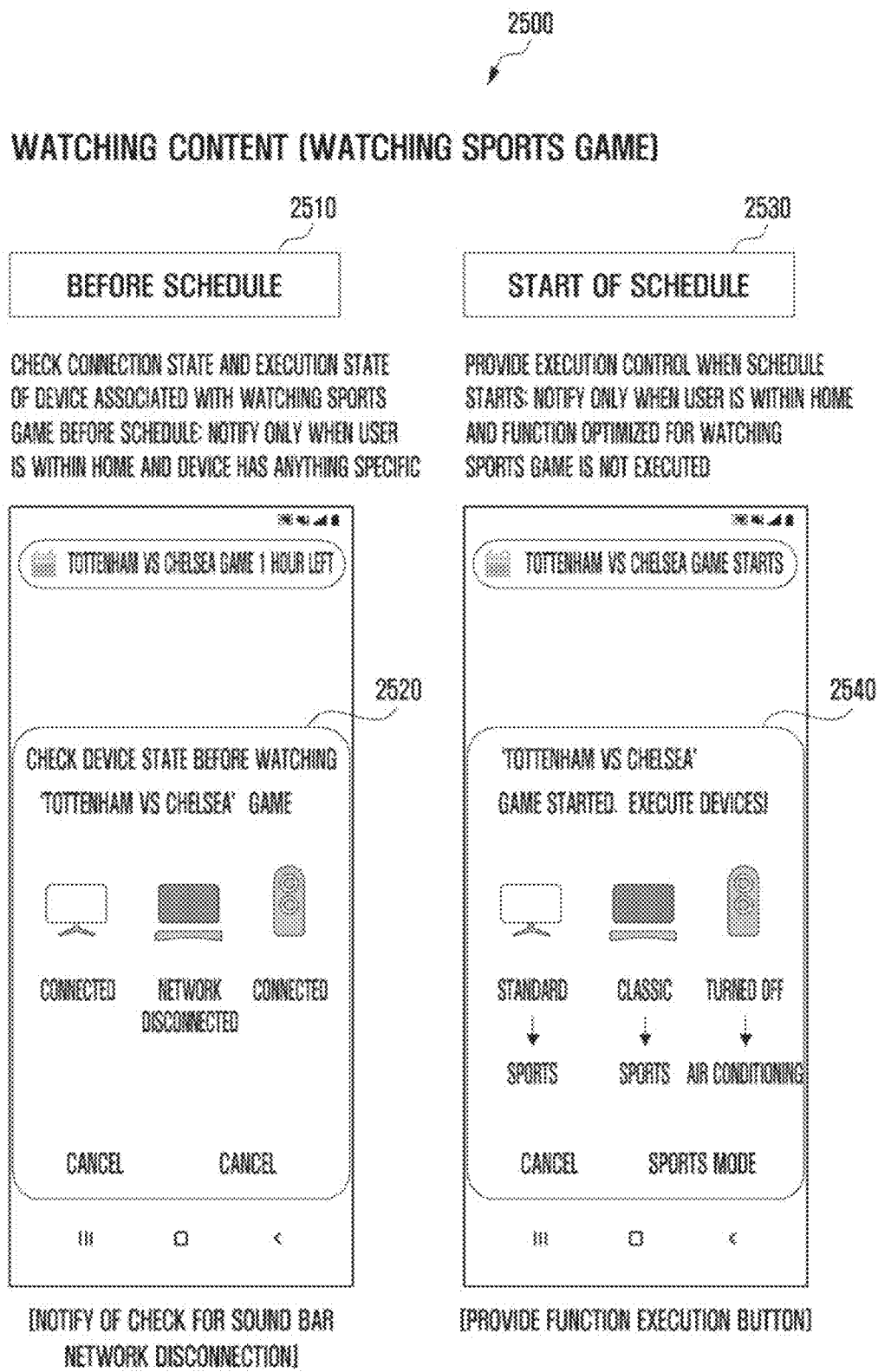
FIGS. 25 and 26 illustrate examples of a control interface provision method according to a user schedule (for example, watching content), according to some embodiments.
Figure 26:
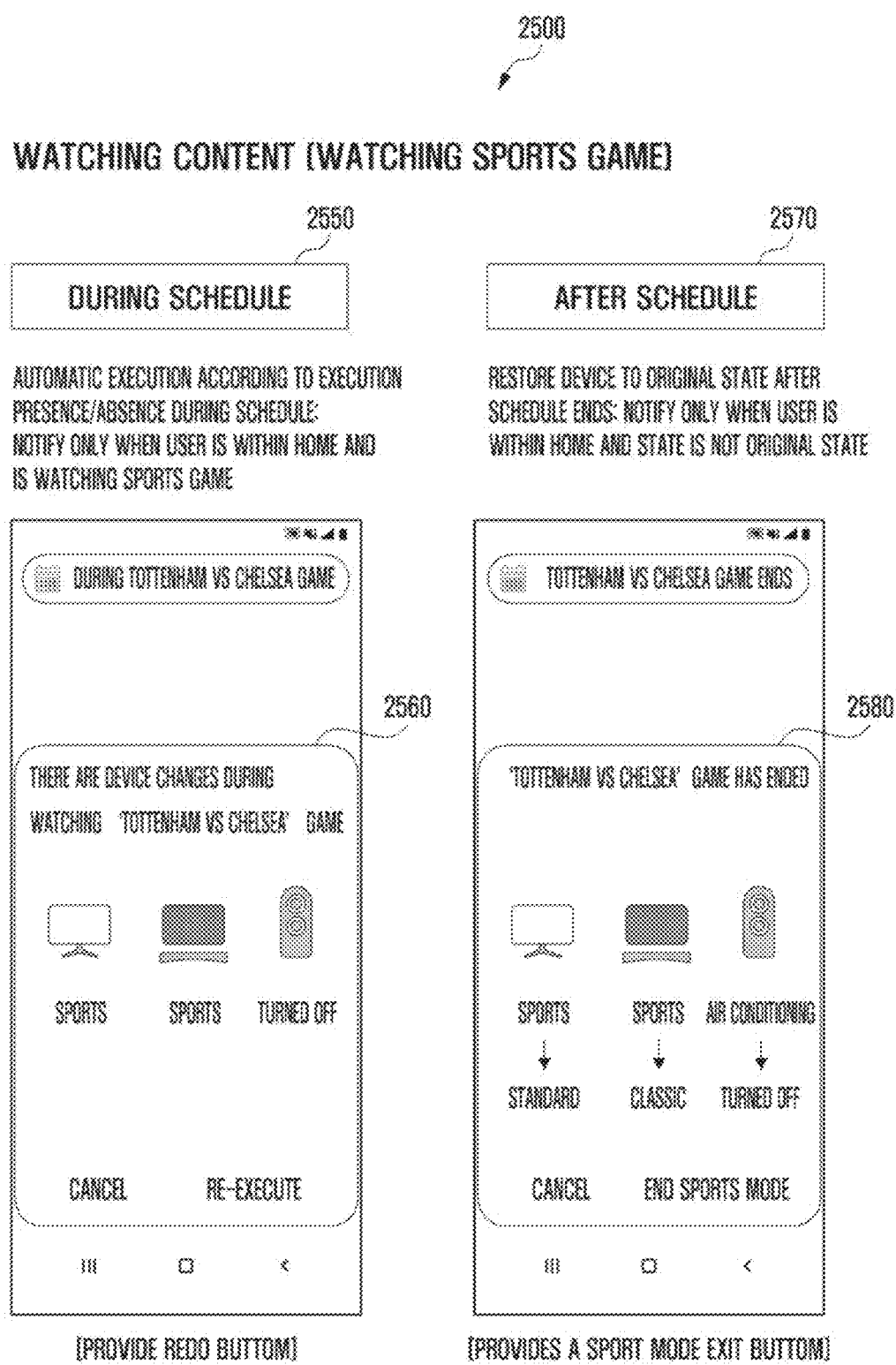

FIGS. 25 and 26 illustrate examples of a control interface provision method according to a user schedule (for example, watching content).

Referring to FIGS. 25 and 26, an electronic device 2500 (for example, the electronic device 300 of FIG. 3, the electronic device 400 of FIG. 4, the electronic device 1000 of FIG. 10, the electronic device 1200 of FIG. 12, the electronic device 1400 of FIG. 14, the electronic device 1600 of FIG. 16, the electronic device 1800 of FIG. 18, or the electronic device 2100 of FIG. 21) or an IOT server (for example, the IOT server 310 of FIG. 3) according to various embodiments may provide a control interface for each of a plurality of smart devices (for example, the plurality of smart devices 330 of FIG. 3) according to a time point (for example, before the schedule 2510, at which the schedule starts 2530, during the schedule 2550, or after the schedule 2570) of the user schedule (for example, watching content).

In an embodiment, the time points of the user schedule (for example, watching content) may include time points before the schedule 2510, at which the schedule starts 2530, during the schedule 2550, and after the schedule 2570.

For example, the electronic device 2500 or the IOT server 310 according to various embodiments may provide a first control interface 2520 (for example, informing of check of sound bar network disconnection) for controlling operations of the plurality of smart devices 330 according to the time point before the schedule 2510 of the user schedule (for example, watching content).

For example, the electronic device 2500 or the IOT server 310 according to various embodiments may provide a second control interface 2540 for controlling the operations of the plurality of smart devices 330 according to the start of the schedule 2530 of the user schedule (for example, watching content).

For example, the electronic device 2500 or the IOT server 310 according to various embodiments may provide a third control interface 2560 (for example, a re-execution button) for controlling the operations of the plurality of smart devices 330 according to the time point during the schedule 2550 of the user schedule (for example, watching content).

For example, the electronic device 2500 or the IOT server 310 according to various embodiments may provide a fourth control interface 2580 (for example, a sports mode end button) for controlling the operations of the plurality of smart devices 330 according to the time point after the schedule 2570 of the user schedule (for example, watching content).

Figure 27:
FIG. 27 illustrates an example of a user configuration option of a control interface for each device (for example, smart device) according to a user schedule (for example, watching content), according to some embodiments.

FIG. 27 illustrates an example of a user configuration option of a control interface for each device (for example, smart device) according to a user schedule (for example, watching content).

Referring to FIG. 27, an electronic device (for example, the electronic device 300 of FIG. 3, the electronic device 400 of FIG. 4, the electronic device 1000 of FIG. 10, the electronic device 1200 of FIG. 12, the electronic device 1400 of FIG. 14, the electronic device 1600 of FIG. 16, the electronic device 1800 of FIG. 18, the electronic device 2100 of FIG. 21, or the electronic device 2500 of FIG. 25) or an IOT server (for example, the IOT server 310 of FIG. 3) according to various embodiments may provide a user configuration option of a control interface for each of a plurality of smart devices (for example, the plurality of smart devices 330 of FIG. 3) according to a user schedule (for example, watching content).

In an embodiment, the smart devices 330 may include mobile devices, speakers, air conditioners, TVs, and sound bars (audio).

In an embodiment, the electronic device or the IOT server 310 according to various embodiments may classify the plurality of smart devices 330 according to a device characteristic and configure operation options of the plurality of smart devices 330.

For example, the electronic device or the IOT server 310 according to various embodiments may classify the plurality of smart devices 330 into device which can move and devices which cannot move on the basis of mobility. The electronic device or the IOT server 310 according to various embodiments may configure an operation option according to the device which can move and the device which cannot move.

For example, the electronic device or the IOT server 310 according to various embodiments may classify the plurality of smart devices 330 into devices which are required to be charged and devices which are not required to be charged on the basis of whether the devices are required to be charged. The electronic device or the IOT server 310 according to various embodiments may configure an operation option according to the device which is required to be charged and the device which is not required to be charted.

For example, the electronic device or the IOT server 310 according to various embodiments may classify the plurality of smart devices 330 into public devices and non-public devices on the basis of whether the devices are public devices. The electronic device or the IOT server 310 according to various embodiments may configure an operation option according to the public device and the non-public device.

FIG. 28 illustrates an example of a user configuration option of a control interface for each time point of a user schedule according to the user schedule (for example, watching content).

Referring to FIG. 28, an electronic device (for example, the electronic device 300 of FIG. 3, the electronic device 400 of FIG. 4, the electronic device 1000 of FIG. 10, the electronic device 1200 of FIG. 12, the electronic device 1400 of FIG. 14, the electronic device 1600 of FIG. 16, the electronic device 1800 of FIG. 18, the electronic device 2100 of FIG. 21, or the electronic device 2500 of FIG. 25) or an IOT server (for example, the IOT server 310 of FIG. 3) according to various embodiments may provide a user configuration option of a control interface for each of a plurality of smart devices (for example, the plurality of smart devices 330 of FIG. 3) according to a time point (for example, before the schedule, at which the schedule starts, during the schedule, or after the schedule) of a user schedule (for example, watching content).

In an embodiment, the smart devices 330 may include mobile devices, speakers, TVs, sound bars (audio), and air conditioners.

In an embodiment, the electronic device or the IOT server 310 according to various embodiments may classify the plurality of smart devices 330 according to the time point (for example, before the schedule, at which the schedule starts, during the schedule, or after the schedule) of the user schedule (for example, watching content) and configure operation options of the plurality of smart devices 330.

In an embodiment, the electronic device or the IOT server 310 according to various embodiments may classify the plurality of smart devices 330 according to the time point before the schedule of the user schedule (for example, watching content) and configure operation options of the plurality of smart devices 330 (for example, power on, power off, communication connection, communication disconnection, mute, air conditioning, and operation mode).

In an embodiment, the electronic device or the IOT server 310 according to various embodiments may classify the plurality of smart devices 330 according to the start of the schedule of the user schedule (for example, watching content) and configure operation options of the plurality of smart devices 330 (for example, power on, power off, communication connection, communication disconnection, mute, air conditioning, and operation mode).

In an embodiment, the electronic device or the IOT server 310 according to various embodiments may classify the plurality of smart devices 330 according to the time point during the schedule of the user schedule (for example, watching content) and configure operation options of the plurality of smart devices 330 (for example, power on, power off, communication connection, communication disconnection, mute, air conditioning, and operation mode).

In an embodiment, the electronic device or the IOT server 310 according to various embodiments may classify the plurality of smart devices 330 according to the time point after the schedule of the user schedule (for example, watching content) and configure operation options of the plurality of smart devices 330 (for example, power on, power off, communication connection, communication disconnection, mute, air conditioning, and operation mode).

FIG. 29 illustrates an example of a user configuration option of a control interface for each device (for example, smart device) according to a user schedule (for example, home training).

Referring to FIG. 29, an electronic device (for example, the electronic device 300 of FIG. 3, the electronic device 400 of FIG. 4, the electronic device 1000 of FIG. 10, the electronic device 1200 of FIG. 12, the electronic device 1400 of FIG. 14, the electronic device 1600 of FIG. 16, the electronic device 1800 of FIG. 18, the electronic device 2100 of FIG. 21, or the electronic device 2500 of FIG. 25) or an IOT server (for example, the IOT server 310 of FIG. 3) according to various embodiments may provide a user configuration option of a control interface for each of a plurality of smart devices (for example, the plurality of smart devices 330 of FIG. 3) according to a user schedule (for example, home training).

In an embodiment, the smart devices 330 may include mobile devices, smart watches, speakers, washing machines, steam closets, air conditioners, TVs, and lights.

In an embodiment, the electronic device or the IOT server 310 according to various embodiments may classify the plurality of smart devices 330 according to a device characteristic and configure operation options of the plurality of smart devices 330.

For example, the electronic device or the IOT server 310 according to various embodiments may classify the plurality of smart devices 330 into device which can move and devices which cannot move on the basis of mobility. The electronic device or the IOT server 310 according to various embodiments may configure an operation option according to the device which can move and the device which cannot move.

For example, the electronic device or the IOT server 310 according to various embodiments may classify the plurality of smart devices 330 into devices which are required to be charged and devices which are not required to be charged on the basis of whether the devices are required to be charged. The electronic device or the IOT server 310 according to various embodiments may configure an operation option according to the device which is required to be charged and the device which is not required to be charted.

For example, the electronic device or the IOT server 310 according to various embodiments may classify the plurality of smart devices 330 into public devices and non-public devices on the basis of whether the devices are public devices. The electronic device or the IOT server 310 according to various embodiments may configure an operation option according to the public device and the non-public device.

FIG. 30 illustrates an example of a user configuration option of a control interface for each time point of a user schedule according to the user schedule (for example, home training).

Referring to FIG. 30, an electronic device (for example, the electronic device 300 of FIG. 3, the electronic device 400 of FIG. 4, the electronic device 1000 of FIG. 10, the electronic device 1200 of FIG. 12, the electronic device 1400 of FIG. 14, the electronic device 1600 of FIG. 16, the electronic device 1800 of FIG. 18, the electronic device 2100 of FIG. 21, or the electronic device 2500 of FIG. 25) or an IOT server (for example, the IOT server 310 of FIG. 3) according to various embodiments may provide a user configuration option of a control interface for each of a plurality of smart devices (for example, the plurality of smart devices 330 of FIG. 3) according to a time point (for example, before the schedule, at which the schedule starts, during the schedule, or after the schedule) of a user schedule (for example, home training).

In an embodiment, the smart devices 330 may include mobile devices, smart watches, speakers, washing machines, steam closets, air conditioners, TVs, and lights.

In an embodiment, the electronic device or the IOT server 310 according to various embodiments may classify the plurality of smart devices 330 according to a time point (for example, before the schedule, at which the schedule starts, during the schedule, or after the schedule) of the user schedule (for example, home training) and configure operation options of the plurality of smart devices 330.

For example, the electronic device or the IOT server 310 according to various embodiments may classify the plurality of smart devices 330 according to the time point before the schedule of the user schedule (for example, home training) and configure operation options of the plurality of smart devices 330 (for example, power on, power off, communication connection, communication disconnection, mute, air conditioning, clean mode, sports mode, sound volume, and operation mode).

For example, the electronic device or the IOT server 310 according to various embodiments may classify the plurality of smart devices 330 according to the start of the schedule of the user schedule (for example, home training) and configure operation options of the plurality of smart devices 330 (for example, power on, power off, communication connection, communication disconnection, mute, air conditioning, clean mode, sports mode, sound volume, and operation mode).

For example, the electronic device or the IOT server 310 according to various embodiments may classify the plurality of smart devices 330 according to the time point during the schedule of the user schedule (for example, home training) and configure operation options of the plurality of smart devices 330 (for example, power on, power off, communication connection, communication disconnection, mute, air conditioning, clean mode, sports mode, sound volume, and operation mode).

For example, the electronic device or the IOT server 310 according to various embodiments may classify the plurality of smart devices 330 according to the time point after the schedule of the user schedule (for example, home training) and configure operation options of the plurality of smart devices 330 (for example, power on, power off, communication connection, communication disconnection, mute, air conditioning, clean mode, sports mode, sound volume, and operation mode).

The electronic device and the method of operating the same according to various embodiments may provide a customized control interface for controlling operations of smart devices having high usage correlation with user schedules on the basis of calendar schedules.

The electronic device and the method of operating the same according to various embodiments may provide a customized control interface for pre-emptively controlling operations of smart devices according to each time point (for example, before the schedule, at which the schedule starts, during the schedule, or after the schedule) of the user schedule.

The electronic device and the method of operating the same according to various embodiments may provide a customized control interface for controlling operations of smart devices in further consideration of a user condition at a time point at which the control interface is provided.

The electronic device and the method of operating the same according to various embodiments may provide a user experience capable of easily controlling operations of a plurality of smart devices by reducing steps of identifying the user schedule, reducing cumbersome steps of finding functions of the plurality of smart devices and controlling the same, and providing a control interface according to the user schedule.

The electronic device and the method of operating the same according to various embodiments may provide the electronic device (for example, smartphone) with a control interface capable of controlling a plurality of smart devices according to a user schedule and control operations of the plurality of smart devices according to a user schedule through the control interface.

The electronic device and the method of operating the same according to various embodiments may provide a control interface capable of controlling operations of a plurality of smart devices when a state of a device (for example, smart device) registered in a user schedule (for example, home working, home training, travel, or watching content) does not match a state of a device at the current time point (for example, smart device).

The electronic device and the method of operating the same according to various embodiments may provide a control interface capable of controlling operations of a plurality of smart devices when a location registered in a user schedule (for example, home working, home training, travel, or watching content) does not match a current user location.

The electronic device and the method of operating the same according to various embodiments may provide a control interface capable of controlling operations of a plurality of smart devices according to a user schedule (for example, home working, home training, travel, or watching content).

The electronic device and the method of operating the same according to various embodiments may provide a control interface capable of controlling operations of a plurality of smart devices for each time point of the user schedule according to the user schedule (for example, home working, home training, travel, or watching content).

An electronic device (the electronic device 101 of FIG. 1, the electronic device 300 of FIG. 3, the electronic device 400 of FIG. 4, the electronic device 1000 of FIG. 10, the electronic device 1200 of FIG. 12, the electronic device 1400 of FIG. 14, the electronic device 1600 of FIG. 16, the electronic device 1800 of FIG. 18, the electronic device 2100 of FIG. 21, or the electronic device 2500 of FIG. 25) according to various embodiments may include a communication module (for example, the communication module 190 of FIG. 1) for making a connection with a plurality of smart devices (for example, the plurality of smart devices 330 of FIG. 3) and an Internet of Things (JOT) server, a processor (for example, the processor 120 of FIG. 1) operatively connected to the communication module (for example, the communication module 190 of FIG. 1), and a memory (for example, the memory 130 of FIG. 1) operatively connected to the processor (for example, the processor 120 of FIG. 1). The memory (for example, the memory 130 of FIG. 1) may include instructions causing the processor (for example, the processor 120 of FIG. 1) to configure a control interface (for example, the control interface 420 of FIG. 4, the control interface 1030 of FIG. 10, the control interface 1230 of FIG. 12, the control interface 1430 of FIG. 14, or the control interface 1630 of FIG. 16) for controlling operations of the plurality of smart devices (for example, the plurality of smart devices 330 of FIG. 3) according to a user schedule type, based on an input user schedule and control the operations of the plurality of smart devices (for example, the plurality of smart devices 330 of FIG. 3) through the control interface (for example, the control interface 420 of FIG. 4, the control interface 1030 of FIG. 10, the control interface 1230 of FIG. 12, the control interface 1430 of FIG. 14, or the control interface 1630 of FIG. 16).

According to an embodiment, the processor (for example, the processor 120 of FIG. 1) may configure the control interface (for example, the control interface 420 of FIG. 4, the control interface 1030 of FIG. 10, the control interface 1230 of FIG. 12, the control interface 1430 of FIG. 14, or the control interface 1630 of FIG. 16) for controlling the operations of the plurality of smart devices (for example, the plurality of smart devices 330 of FIG. 3) according to a time point of the user schedule.

According to an embodiment, the processor (for example, the processor 120 of FIG. 1) may classify the plurality of smart devices (for example, the plurality of smart devices 330 of FIG. 3) according to a device characteristic and provide the control interface (for example, the control interface 420 of FIG. 4, the control interface 1030 of FIG. 10, the control interface 1230 of FIG. 12, the control interface 1430 of FIG. 14, or the control interface 1630 of FIG. 16) according to the device characteristic of the plurality of smart devices (for example, the plurality of smart devices 330 of FIG. 3).

According to an embodiment, the plurality of smart devices (for example, the plurality of smart devices 330 of FIG. 3) may be classified based on whether the plurality of smart devices have mobility, need wired or wireless charging, or are public devices.

According to an embodiment, the control interface (for example, the control interface 420 of FIG. 4, the control interface 1030 of FIG. 10, the control interface 1230 of FIG. 12, the control interface 1430 of FIG. 14, or the control interface 1630 of FIG. 16) may be provided according to the device characteristic of the plurality of smart devices (for example, the plurality of smart devices 330 of FIG. 3) according to the time point before the schedule of the user schedule (for example, before the schedule 1041 of FIG. 11, before the schedule 1241 of FIG. 13, before the schedule 1441 of FIG. 15, or before the schedule 1641 of FIG. 17).

According to an embodiment, the control interface (for example, the control interface 420 of FIG. 4, the control interface 1030 of FIG. 10, the control interface 1230 of FIG. 12, the control interface 1430 of FIG. 14, or the control interface 1630 of FIG. 16) may be provided according to the device characteristic of the plurality of smart devices (for example, the plurality of smart devices 330 of FIG. 3) according to start of the schedule of the user schedule (for example, the start of the schedule 1042 of FIG. 11, the start of the schedule 1241 of FIG. 13, the start of the schedule 1442 of FIG. 15, or the start of the schedule 1642 of FIG. 17).

According to an embodiment, the control interface (for example, the control interface 420 of FIG. 4, the control interface 1030 of FIG. 10, the control interface 1230 of FIG. 12, the control interface 1430 of FIG. 14, or the control interface 1630 of FIG. 16) may be provided according to the device characteristic of the plurality of smart devices (for example, the plurality of smart devices 330 of FIG. 3) according to the time point during the schedule of the user schedule (for example, during the schedule 1043 of FIG. 11, during the schedule 1243 of FIG. 13, during the schedule 1443 of FIG. 15, or during the schedule 1643 of FIG. 17).

According to an embodiment, the control interface (for example, the control interface 420 of FIG. 4, the control interface 1030 of FIG. 10, the control interface 1230 of FIG. 12, the control interface 1430 of FIG. 14, or the control interface 1630 of FIG. 16) may be provided according to the device characteristic of the plurality of smart devices (for example, the plurality of smart devices 330 of FIG. 3) according to the time point after the user schedule (for example, after the schedule 1044 of FIG. 11, after the schedule 1244 of FIG. 13, after the schedule 1444 of FIG. 15, or after the schedule 1644 of FIG. 17).

According to an embodiment, a target time point at which the control interface (for example, the control interface 420 of FIG. 4, the control interface 1030 of FIG. 10, the control interface 1230 of FIG. 12, the control interface 1430 of FIG. 14, or the control interface 1630 of FIG. 16) is activated may be configured according to the time point of the user schedule. A user location may be identified when entering the target time point, and the control interface (for example, the control interface 420 of FIG. 4, the control interface 1030 of FIG. 10, the control interface 1230 of FIG. 12, the control interface 1430 of FIG. 14, or the control interface 1630 of FIG. 16) may be provided according to the user location.

According to an embodiment, a target time point at which the control interface (for example, the control interface 420 of FIG. 4, the control interface 1030 of FIG. 10, the control interface 1230 of FIG. 12, the control interface 1430 of FIG. 14, or the control interface 1630 of FIG. 16) is activated may be configured according to the time point of the user schedule. States of the plurality of smart devices (for example, the plurality of smart devices 330 of FIG. 3) may be identified when entering the target time point, and the control interface (for example, the control interface 420 of FIG. 4, the control interface 1030 of FIG. 10, the control interface 1230 of FIG. 12, the control interface 1430 of FIG. 14, or the control interface 1630 of FIG. 16) may be provided according to the states of the plurality of smart devices (for example, the plurality of smart devices 330 of FIG. 3).

A method of operating an electronic device (for example, the electronic device 101 of FIG. 1, the electronic device 300 of FIG. 3, the electronic device 400 of FIG. 4, the electronic device 1000 of FIG. 10, the electronic device 1200 of FIG. 12, the electronic device 1400 of FIG. 14, the electronic device 1600 of FIG. 16, the electronic device 1800 of FIG. 18, the electronic device 2100 of FIG. 21, or the electronic device 2500 of FIG. 25) according to various embodiments may include making a connection with a plurality of smart devices (for example, the plurality of smart devices 330 of FIG. 3) and an Internet of Things (JOT) server, registering a user schedule, configuring a control interface (for example, the control interface 420 of FIG. 4, the control interface 1030 of FIG. 10, the control interface 1230 of FIG. 12, the control interface 1430 of FIG. 14, or the control interface 1630 of FIG. 16) for controlling operations of the plurality of smart devices (for example, the plurality of smart devices 330 of FIG. 3) according to a user schedule type, and controlling the operation of the plurality of smart devices (for example, the plurality of smart devices 330 of FIG. 3) through the control interface (for example, the control interface 420 of FIG. 4, the control interface 1030 of FIG. 10, the control interface 1230 of FIG. 12, the control interface 1430 of FIG. 14, or the control interface 1630 of FIG. 16).

According to an embodiment, the control interface (for example, the control interface 420 of FIG. 4, the control interface 1030 of FIG. 10, the control interface 1230 of FIG. 12, the control interface 1430 of FIG. 14, or the control interface 1630 of FIG. 16) for controlling the operations of the plurality of smart devices (for example, the plurality of smart devices 330 of FIG. 3) may be configured according to a time point of the user schedule.

According to an embodiment, the plurality of smart devices (for example, the plurality of smart devices 330 of FIG. 3) may be classified according to a device characteristic, and the control interface (for example, the control interface 420 of FIG. 4, the control interface 1030 of FIG. 10, the control interface 1230 of FIG. 12, the control interface 1430 of FIG. 14, or the control interface 1630 of FIG. 16) may be provided according to the device characteristic of the plurality of smart devices (for example, the plurality of smart devices 330 of FIG. 3).

According to an embodiment, the plurality of smart devices (for example, the plurality of smart devices 330 of FIG. 3) may be classified based on whether the plurality of smart devices have mobility, need wired or wireless charging, or are public devices.

According to an embodiment, the control interface (for example, the control interface 420 of FIG. 4, the control interface 1030 of FIG. 10, the control interface 1230 of FIG. 12, the control interface 1430 of FIG. 14, or the control interface 1630 of FIG. 16) may be provided according to the device characteristic of the plurality of smart devices (for example, the plurality of smart devices 330 of FIG. 3) according to the time point before the schedule of the user schedule (for example, before the schedule 1041 of FIG. 11, before the schedule 1241 of FIG. 13, before the schedule 1441 of FIG. 15, or before the schedule 1641 of FIG. 17).

According to an embodiment, the control interface (for example, the control interface 420 of FIG. 4, the control interface 1030 of FIG. 10, the control interface 1230 of FIG. 12, the control interface 1430 of FIG. 14, or the control interface 1630 of FIG. 16) may be provided according to the device characteristic of the plurality of smart devices (for example, the plurality of smart devices 330 of FIG. 3) according to start of the schedule of the user schedule (for example, the start of the schedule 1042 of FIG. 11, the start of the schedule 1241 of FIG. 13, the start of the schedule 1442 of FIG. 15, or the start of the schedule 1642 of FIG. 17).

According to an embodiment, the control interface (for example, the control interface 420 of FIG. 4, the control interface 1030 of FIG. 10, the control interface 1230 of FIG. 12, the control interface 1430 of FIG. 14, or the control interface 1630 of FIG. 16) may be provided according to the device characteristic of the plurality of smart devices for example, the plurality of smart devices 330 of FIG. 3) according to the time point during the schedule of the user schedule (for example, during the schedule 1043 of FIG. 11, during the schedule 1243 of FIG. 13, during the schedule 1443 of FIG. 15, or during the schedule 1643 of FIG. 17).

According to an embodiment, the control interface (for example, the control interface 420 of FIG. 4, the control interface 1030 of FIG. 10, the control interface 1230 of FIG. 12, the control interface 1430 of FIG. 14, or the control interface 1630 of FIG. 16) may be provided according to the device characteristic of the plurality of smart devices (for example, the plurality of smart devices 330 of FIG. 3) according to the time point after the user schedule (for example, after the schedule 1044 of FIG. 11, after the schedule 1244 of FIG. 13, after the schedule 1444 of FIG. 15, or after the schedule 1644 of FIG. 17).

According to an embodiment, a target time point at which the control interface (for example, the control interface 420 of FIG. 4, the control interface 1030 of FIG. 10, the control interface 1230 of FIG. 12, the control interface 1430 of FIG. 14, or the control interface 1630 of FIG. 16) is activated may be configured according to the time point of the user schedule. A user location may be identified when entering the target time point, and the control interface (for example, the control interface 420 of FIG. 4, the control interface 1030 of FIG. 10, the control interface 1230 of FIG. 12, the control interface 1430 of FIG. 14, or the control interface 1630 of FIG. 16) may be provided according to the user location.

According to an embodiment, a target time point at which the control interface (for example, the control interface 420 of FIG. 4, the control interface 1030 of FIG. 10, the control interface 1230 of FIG. 12, the control interface 1430 of FIG. 14, or the control interface 1630 of FIG. 16) is activated may be configured according to the time point of the user schedule. States of the plurality of smart devices (for example, the plurality of smart devices 330 of FIG. 3) may be identified when entering the target time point, and the control interface (for example, the control interface 420 of FIG. 4, the control interface 1030 of FIG. 10, the control interface 1230 of FIG. 12, the control interface 1430 of FIG. 14, or the control interface 1630 of FIG. 16) may be provided according to the states of the plurality of smart devices (for example, the plurality of smart devices 330 of FIG. 3).

The electronic device and the method of operating the same according to various embodiments may provide a customized control interface for controlling operations of smart devices having high usage correlation with user schedules on the basis of calendar schedules.

The electronic device and the method of operating the same according to various embodiments may provide a customized control interface for pre-emptively controlling operations of smart devices according to each time point (for example, before the schedule, at which the schedule starts, during the schedule, or after the schedule) of the user schedule.

The electronic device and the method of operating the same according to various embodiments may provide a customized control interface for controlling operations of smart devices in further consideration of a user condition at a time point at which the control interface is provided.

The electronic device and the method of operating the same according to various embodiments may provide a user experience capable of easily controlling operations of a plurality of smart devices by reducing steps of identifying the user schedule, reducing cumbersome steps of finding functions of the plurality of smart devices and controlling the same, and providing a control interface according to the user schedule.

The electronic device and the method of operating the same according to various embodiments may provide the electronic device (for example, smartphone) with a control interface capable of controlling a plurality of smart devices according to a user schedule and control operations of the plurality of smart devices according to a user schedule through the control interface.

The electronic device and the method of operating the same according to various embodiments may provide a control interface capable of controlling operations of a plurality of smart devices when a state of a device (for example, smart device) registered in a user schedule (for example, home working, home training, travel, or watching content) does not match a state of a device at the current time point (for example, smart device).

The electronic device and the method of operating the same according to various embodiments may provide a control interface capable of controlling operations of a plurality of smart devices when a location registered in a user schedule (for example, home working, home training, travel, or watching content) does not match a current user location.

The electronic device and the method of operating the same according to various embodiments may provide a control interface capable of controlling operations of a plurality of smart devices according to a user schedule (for example, home working, home training, travel, or watching content).

The electronic device and the method of operating the same according to various embodiments may provide a control interface capable of controlling operations of a plurality of smart devices for each time point of the user schedule according to the user schedule (for example, home working, home training, travel, or watching content).

The disclosure has been illustrated and described with reference to various implementations thereof, but it is understood by those skilled in the art that various changes in forms and details can be made without departing the idea and scope of the disclosure. The disclosure is defined by the accompanying claims and equivalent thereto.

What is claimed is:

1. An electronic device comprising:
a communication circuit configured to connect with an Internet of Things server and a plurality of smart devices, the plurality of smart devices including a plurality of different types of smart devices;
a processor operatively connected to the communication circuit; and
memory for storing instructions that, when executed by the processor, cause the electronic device to:
identify target smart devices that have a usage correlation with a user schedule type of a user schedule, the target smart devices including at least two different types of smart devices;
configure a control interface for controlling, through a single interface, a plurality of operations that correspond respectively to the target smart devices, according to the user schedule type of the user schedule; check a location registered in a user schedule and a current user location; activate the control interface to display the control interface at a target time point associated with the user schedule, and display the control interface to control the target smart devices when there is a mismatch between the location registered in the user schedule and the current user location, the displayed control interface including individual controls for each of the target smart devices; and
control the plurality of operations of the target smart devices based a user input to the individual controls that is received through the displayed control interface.

2. The electronic device of claim 1, wherein the instructions further cause the electronic device to classify the plurality of smart devices according to a device characteristic, and provide the control interface according to the device characteristic.

3. The electronic device of claim 2, wherein the device characteristic comprises whether a smart device has mobility, needs wired or wireless charging, or is a public device.

4. The electronic device of claim 2, wherein the time point is before the user schedule, and the control interface is provided before the user schedule.

5. The electronic device of claim 2, wherein the time point is a start of the user schedule, and the control interface is provided at the start of the user schedule.

6. The electronic device of claim 2, wherein the time point is during the user schedule, and the control interface is provided during the user schedule.

7. The electronic device of claim 2, wherein the time point is after the user schedule, and the control interface is provided after the user schedule.

8. The electronic device of claim 2, wherein the instructions further cause the electronic device to:
determine a user location when the target time point occurs, and
provide the control interface according to the user location that is determined.

9. The electronic device of claim 2, wherein the instructions further cause the electronic device to:
determine states of the plurality of smart devices when the target time point occurs, and
provide the control interface according to the states of the plurality of smart devices.

10. A method of operating an electronic device, the method comprising:
connecting with an Internet of Things server and a plurality of smart devices, the plurality of smart devices including a plurality of different types of smart devices;
registering a user schedule;
identifying target smart devices that have a usage correlation with a user schedule type of a user schedule, the target smart devices including at least two different types of smart devices;
configuring a control interface for controlling, through a single interface, a plurality of operations that correspond respectively to the target smart devices, according to the user schedule type of the user schedule;
checking a location registered in a user schedule and a current user location;
activating the control interface to display the control interface at a target time point associated with the user schedule, and displaying the control interface to control the target smart devices when there is a mismatch between the location registered in the user schedule and the current user location, the displayed control interface including individual controls for each of the target smart devices; and
controlling the plurality of operations of the target smart devices based on a user input to the individual controls that is received through the displayed control interface.

11. The method of claim 10, wherein the plurality of smart devices are classified according to a device characteristic, and the control interface is provided according to the device characteristic.

12. The method of claim 11, wherein the device characteristic comprises whether a smart device has mobility, needs wired or wireless charging, or is a public device.

13. The method of claim 11, wherein the time point is before the user schedule, and the control interface is provided before the user schedule.

14. The method of claim 11, wherein the time point is a start of the user schedule, and the control interface is provided at the start of the user schedule.

15. The method of claim 11, wherein the time point is during the user schedule, and the control interface is provided during the user schedule.

16. The method of claim 11, wherein the time point is after the user schedule, and the control interface is provided after the user schedule.

17. The method of claim 11, wherein the method further comprises:
determining a user location when the target time point occurs, and
providing the control interface according to the user location that is determined.

18. The method of claim 11, wherein the method further comprises:
determining states of the plurality of smart devices when the target time point occurs, and
providing the control interface according to the states of the plurality of smart devices.

* * * * *